United States Patent
Katakura

(10) Patent No.: US 7,907,349 B2
(45) Date of Patent: Mar. 15, 2011

(54) ZOOM LENS AND IMAGE PICKUP APPARATUS EQUIPPED WITH SAME

(75) Inventor: Masahiro Katakura, Chofu (JP)

(73) Assignee: Olympus Imaging Corp., Tokyo (JP)

( * ) Notice: Subject to any disclaimer, the term of this patent is extended or adjusted under 35 U.S.C. 154(b) by 43 days.

(21) Appl. No.: 12/459,763

(22) Filed: Jul. 6, 2009

(65) Prior Publication Data
US 2010/0007966 A1 Jan. 14, 2010

(30) Foreign Application Priority Data
Jul. 9, 2008 (JP) ................. 2008-178776

(51) Int. Cl.
*G02B 15/14* (2006.01)
*H04N 5/262* (2006.01)

(52) U.S. Cl. .................... 359/676; 348/240.3

(58) Field of Classification Search ............. 348/240.3, 348/E3.043; 359/676, 684, 686, 687
See application file for complete search history.

(56) References Cited

U.S. PATENT DOCUMENTS
| | | | |
|---|---|---|---|
| 7,342,730 B2 * | 3/2008 | Yoneyama | 359/763 |
| 7,692,872 B2 * | 4/2010 | Hankawa et al. | 359/690 |
| 2006/0291070 A1 | 12/2006 | Terada et al. | |

FOREIGN PATENT DOCUMENTS
| | | |
|---|---|---|
| JP | 2005-055625 | 3/2005 |
| JP | 2005-107273 | 4/2005 |
| JP | 2007-010695 | 1/2007 |

\* cited by examiner

*Primary Examiner* — David N Spector
(74) *Attorney, Agent, or Firm* — Kenyon & Kenyon LLP

(57) ABSTRACT

A zoom lens includes, in order from the object side thereof, a first lens unit having a positive refracting power, which is movable during zooming, a second lens unit having a negative refracting power, which is movable during zooming, a third lens unit having a positive refracting power, which is movable during zooming, a fourth lens unit having a positive refracting power, which is movable during zooming, a fifth lens unit having a positive refracting power, which is movable or stationary during zooming. The zoom lens further includes an aperture stop that moves integrally with the third lens unit during zooming. The first lens unit is located closer to the object side at the telephoto end than at the wide angle end, and the third lens unit is located closer to the object side at the telephoto end than at the telephoto end. The first lens unit is composed of only one cemented lens made up of a negative lens element and a positive lens element arranged in order from the object side, and the third lens unit includes at least two positive lens elements. The zoom lens satisfies a certain condition.

18 Claims, 15 Drawing Sheets

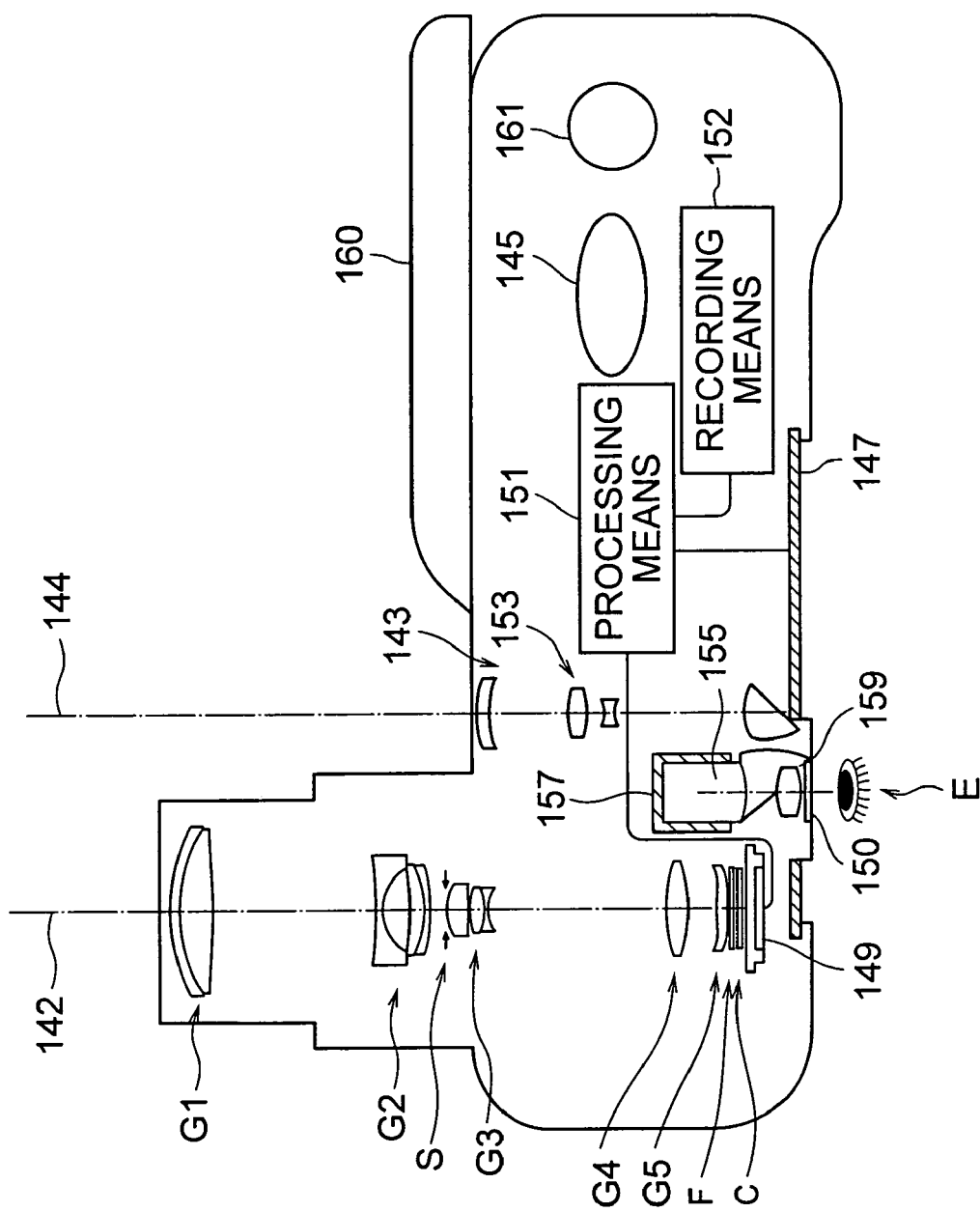

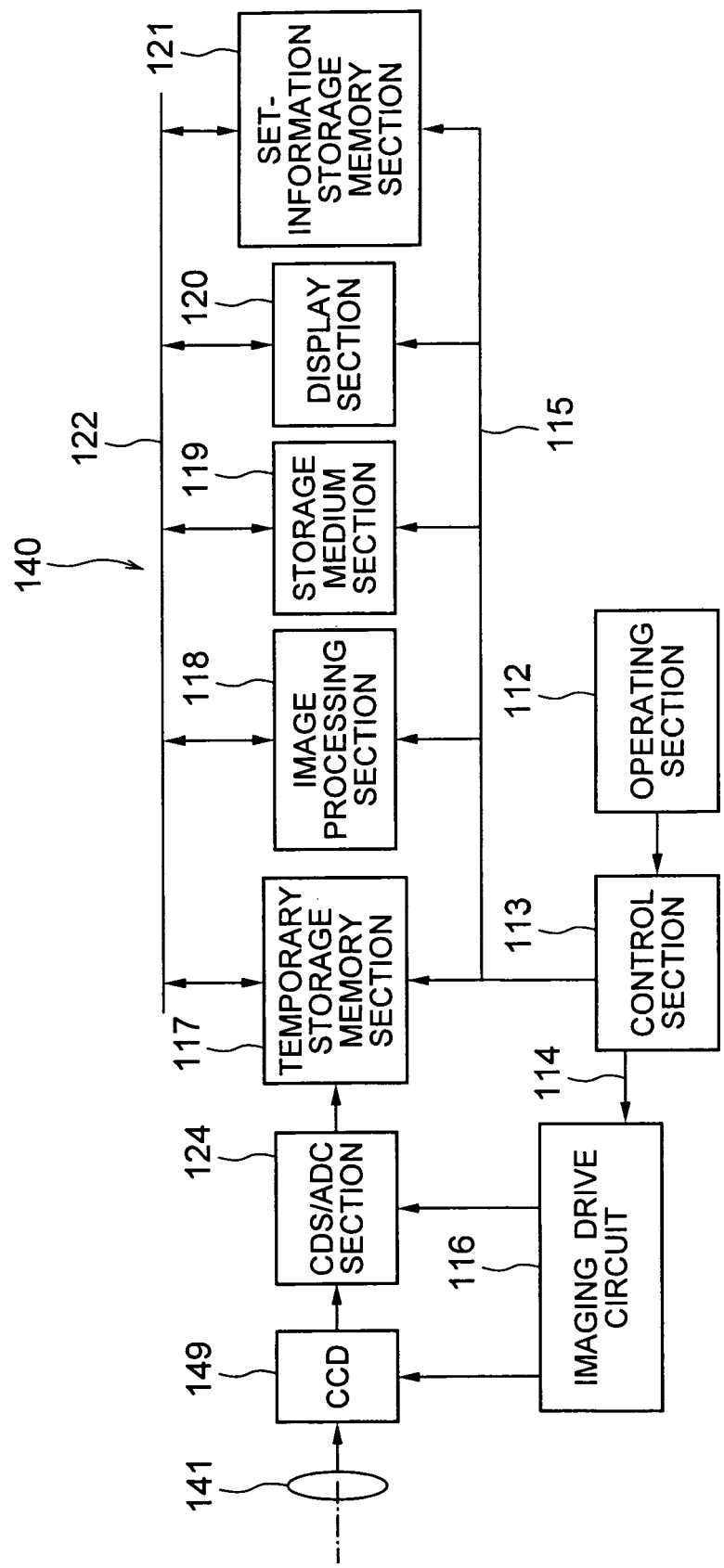

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2008-178776 filed on Jul. 9, 2008; the entire contents of which are incorporated herein by reference.

BACKGROUND OF THE INVENTION

1. Field of the Invention

The present invention relates to a zoom lens and an electronic image pickup apparatus equipped with the same, and in particular to an electronic image pickup apparatus, such as a video camera and a digital camera, in which reduction in the depth is achieved by an inventive optical design of a zoom lens and a zoom lens used in the image pickup apparatus.

2. Description of the Related Art

Nowadays, film cameras are not the mainstream, and digital cameras that pick up an image of an object using a solid state image pickup element such as a CCD or CMOS sensor have replaced film cameras to become the mainstream. Digital cameras are not limited to one category, but there are a number of categories of digital cameras ranging from popular-priced compact type cameras to high-class function-rich cameras. The present invention can suitably be applied, among others, to compact type digital cameras.

Users of such compact type digital cameras generally wish to enjoy easy and simple shooting in wide-ranging shooting situations anywhere at any time. For this reason, such users favor small size digital cameras, in particular cameras that are small with respect to the thickness direction (i.e. depth) and can be conveniently carried in a pocket of clothes or a bag. For the same reason, a further reduction in the size of the taking lens system is demanded.

Meanwhile, there is a trend toward increases in the number of pixels of image pickup elements, and zoom lenses are required to have high optical performance matched with the increased number of pixels of image pickup elements. Apart from such needs of users, it is necessary for digital camera manufacturers to keep the production low and to achieve a high mass productivity in order to make profits. To this end, it is necessary to reduce the sensitivity of deterioration in optical performance to production errors occurring in the process of manufacturing and assembling of lenses.

Zoom lenses having high zoom ratios of 7 to 10 or more have become popular, because they can be used in a wider variety of shooting situations. While there is a demand for further increases in the zoom ratio, there also is a demand for wider angles of field that enable easy shooting of indoor scenes. To meet such demands of users, various types of zoom lens systems have been developed.

As a relatively compact prior art zoom lens matched with an image pickup element having a large number of pixels, there is a known type of zoom lens, which includes, in order from the object side thereof, a positive first lens unit, a negative second lens unit, a positive third lens unit, a positive fourth lens unit, and a positive fifth lens unit, as disclosed in Japanese Patent Application Laid-Open No. 2005-107273. In this zoom lens, the first lens unit is composed of a cemented lens made up of a positive lens and a negative lens, which enables good correction of on-axis chromatic aberration while making the zoom lens compact.

There is another prior art zoom lens system, which includes, in order from the object side thereof, a positive first lens unit, a negative second lens unit, a positive third lens unit, a positive fourth lens unit, and a positive fifth lens unit, as disclosed in Japanese Patent Application Laid-Open No. 2005-55625.

This zoom lens has a zoom ratio of about 4, and on-axis and off-axis aberrations therein are corrected excellently.

As another prior art, Japanese Patent Application Laid-Open No. 2007-10695 discloses an optical system including, in order from the object side thereof, a positive first lens unit, a negative second lens unit, a positive third lens unit, a positive fourth lens unit, a positive fifth lens unit and having a zoom ratio of as high as 20. This optical system has two positive lenses in the third lens unit, whereby relatively good optical performance is achieved though the optical system has a very high zoom ratio of 20.

SUMMARY OF THE INVENTION

To solve the above-described problems and achieve the above object, a zoom lens according to a first aspect of the present invention comprises, in order from the object side thereof, a first lens unit having a positive refracting power, which is movable during zooming, a second lens unit having a negative refracting power, which is movable during zooming, a third lens unit having a positive refracting power, which is movable during zooming, a fourth lens unit having a positive refracting power, which is movable during zooming, a fifth lens unit having a positive refracting power, which is movable or stationary during zooming, wherein the zoom lens further includes an aperture stop that moves integrally with the third lens unit during zooming, the first lens unit is located closer to the object side at the telephoto end than at the wide angle end, the third lens unit is located closer to the object side at the telephoto end than at the telephoto end, the first lens unit is composed of only one cemented lens made up of a negative lens element and a positive lens element arranged in order from the object side, and the third lens unit includes at least two positive lens elements.

An image pickup apparatus according to a second aspect of the present invention comprises:

the above-described zoom lens; and an image transforming section that transforms, by image processing, an electrical signal representing an image containing distortion attributed to the zoom lens into an image signal representing an image in which distortion is corrected.

BRIEF DESCRIPTION OF THE DRAWINGS

FIG. 14 is a cross sectional view of the digital camera; and

FIG. 15 is a block diagram of an internal circuit of a principal portion of the digital camera.

DETAILED DESCRIPTION OF THE INVENTION

Figure 1A:
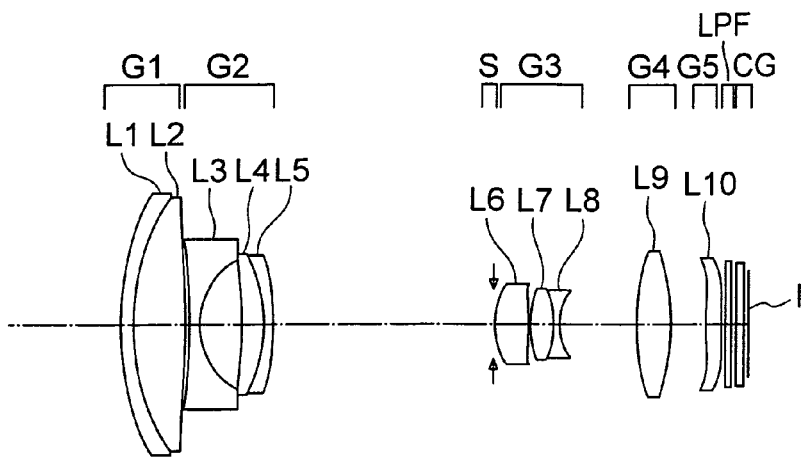
FIGS. 1A, 1B, and 1C are cross sectional views of a zoom lens according to a first embodiment of the present invention in the state in which the zoom lens is focused on a object point at infinity respectively at the wide angle end (FIG. 1A), in an intermediate state (FIG. 1B), and at the telephoto end (FIG. 1C)

A zoom lens according to the present invention includes, in order from the object side thereof, a first lens unit having a positive refracting power, which is movable during zooming, a second lens unit having a negative refracting power, which is movable during zooming, a third lens unit having a positive refracting power, which is movable during zooming, a fourth lens unit having a positive refracting power, which is movable during zooming, and a fifth lens unit having a positive refracting power, which is movable or stationary during zooming, wherein the zoom lens further includes an aperture stop that moves integrally with the third lens unit during zooming, the first lens unit is located closer to the object side at the telephoto end than at the wide angle end, the third lens unit is located closer to the object side at the telephoto end than at the wide angle end, the first lens unit is composed of only one cemented lens made up of a negative lens element and a positive lens element arranged in the mentioned order from the object side, and the third lens unit includes at least two positive lens elements.

In the following, the reason why the above-described zoom lens design is adopted, and advantageous effects of this design will be described.

The zoom lens is configured to include, in order from the object side, the first lens unit having a positive refracting power that is movable during zooming, the second lens unit having a negative refracting power that is movable during zooming, the third lens unit having a positive refracting power that is movable during zooming, the fourth lens unit having a positive refracting power that is movable during zooming, and the fifth lens unit having a positive refracting power that is movable or stationary during zooming. With this configuration, the magnification changing functions are efficiently allotted to the respective lens units. Thus, changes in aberrations during zooming are made small, and the amounts of movement of the lens units are prevented from becoming large. This facilitates a reduction in the size of the optical system. Having one negative lens element and one positive lens element in the first lens unit enables good aberration correction throughout the entire zoom range from the wide angle end to the telephoto end.

Furthermore, cementing the negative lens element and the positive lens element in the first lens unit enables good correction of on-axis and off-axis chromatic aberrations. The reason why the first lens unit is designed to have no lenses other than one negative lens element and one positive lens element is that constituting the first lens unit of a small number of lenses enables a reduction in the thickness of the zoom lens with respect to the optical axis direction to thereby make the lens frame compact with respect to the thickness direction in the collapsed state.

Having the fifth lens unit enables good correction of curvature of field, among others. The fifth lens unit can provide good correction of curvature of field. Consequently, displacement of the image plane in focusing from infinity to the shortest object distance performed by moving the fourth lens unit is small. Therefore, an optical system in which good correction of aberrations is achieved for both an object point at infinity and an object point at the shortest distance can be developed.

Furthermore, by having at least two positive lens elements in the third lens unit that functions as a variator, the positive refracting power needed to provide the magnification change is appropriately shared by these lens elements. This feature also enables good correction of on-axis chromatic aberration, among others.

The following conditional expression (1) specifies a condition for allowing the lens surface closest to the object side and the lens surface closest to the image side in the first lens unit to satisfactorily share the positive refracting power of the first lens unit:

$$-1.03 < (r_{G1RF} + r_{G1RR})/(r_{G1RF} - r_{G1RR}) < -0.30 \quad (1)$$

where $r_{G1RF}$ is the paraxial radius of curvature of the lens surface closest to the object side in the first lens unit, and $r_{G1RR}$ is the paraxial radius of curvature of the lens surface closest to the image side in the first lens unit.

If the upper limit or the lower limit of conditional expression (1) is exceeded, the positive refractive power is provided by only one of these lens surfaces. This tends to lead to an undesirable increase in aberrations (in particular spherical aberrations at the telephoto end).

Furthermore, it is more preferred that the above-described zoom lens according to the present invention have one or more of the following features.

It is preferred that the zoom lens according to the present invention satisfy the following conditional expression:

$$0.3 < P_{w5}/P_{w1} < 2.0 \quad (2)$$

where $P_{w1}$ is the refracting power of the first lens unit, and $P_{w5}$ is the refracting power of the fifth lens unit.

Conditional expression (2) relates to the power arrangement of the fifth lens unit and the first lens unit. Since the first lens unit is composed of a cemented lens made up of a positive lens element and a negative lens element, it is difficult to correct off-axis aberrations (in particular, curvature of field). If the refracting powers of the first lens unit and the fifth lens unit are selected in such a way that conditional expression (2) is satisfied, the positive power can be shared by the lens units appropriately. Then, good correction of curvature of field can be achieved. By arranging the refracting powers appropriately in this way, increases in aberrations are prevented even if the entire length of the zoom lens is made small, and an optical system that is small in size and has good optical performance can be provided.

It is also preferred in the zoom lens according to the present invention that the fourth lens unit be composed of only one positive lens element.

As the third lens unit includes at least two positive lens elements, the positive refracting power can be shared appropriately by them, and aberrations generated in the third lens unit can be made small. Therefore, the fourth lens unit can be designed to be composed of only one positive lens element. In consequence, cost reduction and slimming of the zoom lens in the collapsed state can be achieved.

It is also preferred in the zoom lens according to the present invention that the fifth lens unit be composed of only one positive lens element.

By constituting the fifth lens unit of only one positive lens element, cost reduction and slimming of the zoom lens in the collapsed state can be achieved.

It is also preferred in the zoom lens according to the present invention that focusing operation from an object at a long distance to an object at a short distance be performed by moving the fourth lens unit toward the object side.

Focusing by the fourth lens unit facilitates a reduction in curvature of field at object points ranging from infinitely distant object point to a closest object point, whereby good optical performance can be achieved. Use of the fourth lens unit, which can easily be made small, as the focusing lens unit facilitates a reduction in the load on a drive system upon focusing operation.

It is also preferred in the zoom lens according to the present invention that the second lens unit include, in order from the object side, a negative lens element, and a cemented lens made up of a negative lens element and a positive lens element, and satisfy the following conditional expression:

$$0.8 < D_{G2}/f_W < 2.0 \quad (3)$$

where $D_{G2}$ is the thickness of the second lens unit on the optical axis, and $f_W$ is the focal length of the entire zoom lens system at the wide angle end.

By arranging the negative lens element and the cemented lens made up of the negative lens element and the positive lens element in order from the object side in the second lens unit to make a principal point closer to the object side, the distance between the principal point of the second lens unit and the principal point of the first lens unit can be made shorter. In consequence, an increase in the diametrical size of the first lens unit and the second lens unit can be prevented particularly at the wide angle end.

In addition, if conditional expression (3) is satisfied, the size of the lens frame in the collapsed state is prevented from becoming large. Thus, the optical system can be made compact. If the upper limit of conditional expression (3) is exceeded, the size of the lens frame in the collapsed state undesirably becomes large. If the lower limit of conditional expression (3) is exceeded, it becomes difficult to dispose the negative lens element and the cemented lens made up of the negative lens element and the positive lens element. This is undesirable.

It is also preferred that the zoom lens according to the present invention be designed in such a way as to satisfy the following conditional expression:

$$-1.0 < (r_{G1tF} + r_{G1tR})/(r_{G1tF} - r_{G1tR}) < -0.2 \quad (4)$$

where $r_{G1tF}$ is the paraxial radius of curvature of the object side surface of the positive lens element in the first lens unit, and $r_{G1tR}$ is the paraxial radius of curvature of the image side surface of the positive lens element in the first lens unit.

The conditional expression (4) relates to the shape factor of the positive lens element in the first lens unit. As the first lens unit is composed only of the cemented lens made up of one negative lens element and one positive lens element, it is preferred that the positive lens element be made of a low dispersion glass material in order to reduce chromatic aberration. However, since the refractive indices of low dispersion glass materials are generally low, a sufficiently high positive refracting power cannot be provided unless the paraxial radii of curvature of the lens surfaces satisfy conditional expression (4). If the upper limit of conditional expression (4) is exceeded, one of the lens surfaces will have an unduly high refracting power, whereby spherical aberration is caused especially at the telephoto end. This is undesirable.

It is also preferred that the zoom lens according to the present invention be designed in such a way as to satisfy the following conditional expression:

$$0 < (r_{G5tF} + r_{G5tR})/(r_{G5tF} - r_{G5tR}) < 0.5 \quad (5)$$

where $r_{G5tF}$ is the paraxial radius of curvature of the object side surface of the positive lens element in the fifth lens unit, and $r_{G5tR}$ is the paraxial radius of curvature of the image side surface of the positive lens element in the fifth lens unit.

Conditional expression (5) relates to the shape factor of the fifth lens unit. If conditional expression (5) is satisfied, a refracting power that the fifth lens unit needs to have can be shared appropriately by the object side surface and the image side surface. Therefore, good correction of curvature of field can be achieved, whether the zoom lens is focused at an infinitely distant object point or a closest object point.

It is also preferred that the zoom lens according to the present invention be designed in such a way as to satisfy the following conditional expressions at the same time:

$$1.45 < Nd_{G1t} < 1.6 \quad (6)$$

$$65 < \nu d_{G1t} < 90 \quad (7)$$

where $Nd_{G1t}$ is the refractive index for the d-line of the positive lens element in the first lens unit, and $\nu d_{G1t}$ is the Abbe number of the positive lens element in the first lens unit.

Conditional expressions (6) and (7) need to be satisfied in order to suppress on-axis chromatic aberration and chromatic aberration of magnification in the first lens unit. Use of a lens having a refractive index and an Abbe number that fall within the respective range defined by conditional expressions (6) and (7) is effective in achieving achromatization. Use of a lens that does not satisfy conditional expression (6) or (7) will cause chromatic aberration or lead to an unduly large increase in the cost. This is undesirable.

It is also preferred that the zoom lens according to the present invention be designed in such a way as to satisfy the following conditional expressions at the same time:

$$1.45 < Nd_{G5t} < 1.6 \quad (8)$$

$$65 < \nu d_{G5t} < 90 \quad (9)$$

where $Nd_{G5t}$ is the refractive index for the d-line of the positive lens element in the fifth lens unit, and $\nu d_{G5t}$ is the Abbe number of the positive lens element in the fifth lens unit.

If the positive refracting powers are appropriately allotted to the first lens unit and the fifth lens unit, a low dispersion lens having a low refractive index can be used as the positive lens element in the fifth lens unit, and thus conditional expressions (8) and (9) are satisfied.

It is also preferred in the zoom lens according to the present invention that the third lens unit be composed of two positive lens elements and one negative lens element arranged in order from the object side.

By composing the third lens unit of the two positive lens elements and one negative lens element arranged in order from the object side, good correction of on-axis and off-axis chromatic aberration can be achieved.

It is also preferred in the zoom lens according to the present invention that the first lens unit have at least one aspheric surface, and the following conditional expression be satisfied:

$$4.0 < C_j(w)/f_w < 15.0 \quad (10)$$

where $f_w$ is the focal length of the entire zoom lens system at the wide angle end, and $C_j(w)$ is the entire length of the zoom lens at the wide angle end, the entire length being defined as the sum of the distance, on the optical axis, from the incidence surface of the lens located closest to the object side in the zoom lens to the emergence surface of the lens located closest to the image side in the zoom lens and the back focus represented by the equivalent distance in air.

Conditional expression (10) limits the maximum value of the entire length of the zoom lens relative to the focal length of the zoom lens at the wide angle end, providing an appropriate compromise between slimming of the lens frame and aberration correction.

If the lower limit of conditional expression (10) is not exceeded, a reduction in the refracting power of each lens unit can be facilitated, which is advantageous in achieving well-balanced correction of aberrations such as chromatic aberration in the first lens unit, off-axis aberrations in the second lens unit, and on-axis aberrations in the third lens unit at the wide angle end. In addition, a reduction in the affection of manufacturing errors on aberrations is facilitated. If the upper limit of conditional expression (10) is not exceeded, the entire length of the zoom lens is made shorter.

It is preferred that the zoom lens according to the present invention be designed in such a way as to satisfy the following conditional expression:

$$0.8 < C_j(t)/f_t < 2.5 \quad (11)$$

where $f_t$ is the focal length of the entire zoom lens system at the telephoto end, and $C_j(t)$ is the entire length of the zoom lens at the telephoto end, the entire length being defined as the sum of the distance, on the optical axis, from the incidence surface of the lens located closest to the object side in the zoom lens to the emergence surface of the lens located closest to the image side in the zoom lens and the back focus represented by the equivalent distance in air.

Conditional expression (11) limits the maximum value of the entire length of the zoom lens relative to the focal length of the zoom lens at the telephoto end, providing an appropriate compromise between slimming of the lens frame and aberration correction.

If the lower limit of conditional expression (11) is not exceeded, a reduction in the refracting power of each lens unit can be facilitated, which is advantageous in achieving well-balanced correction of aberrations such as chromatic aberration in the first lens unit, off-axis aberrations in the second lens unit, and on-axis aberrations in the third lens unit at the wide angle end. In addition, a reduction in the affection of manufacturing errors on aberrations is facilitated. If the upper limit of conditional expression (11) is not exceeded, the entire length of the zoom lens is made shorter.

It is preferred that the zoom lens according to the present invention be designed in such a way as to satisfy the following conditional expression:

$$1.1 < C_j(t)/C_j(w) < 1.8 \quad (12)$$

where $C_j(w)$ is the entire length of the zoom lens at the wide angle end, and $C_j(t)$ is the entire length of the zoom lens at the telephoto end, the entire length being defined as the sum of the distance, on the optical axis, from the incidence surface of the lens located closest to the object side in the zoom lens to the emergence surface of the lens located closest to the image side in the zoom lens and the back focus represented by the equivalent distance in air.

Conditional expression (12) relates to the ratio of the entire length of the zoom lens at the telephoto end and that at the wide angle end. If the first lens unit is designed to be advanced to the object side in such a way that the value of $C_j(t)/C_j(w)$ falls within the range defined by conditional expression (12), a space that allows movement of the second and third lens units for zooming can be available. If the lower limit of conditional expression (12) is exceeded, the aforementioned space cannot be available. If the upper limit of conditional expression (12) is exceeded, the entire length of the zoom lens at the telephoto end becomes unduly long, which leads to an increase in the size of the lens frame. This is not desirable.

It is also preferred in the zoom lens according to the present invention that during zooming from the wide angle end to the telephoto end, the second lens unit move first toward the object side and thereafter toward the image side, and the following conditional expression (13) be satisfied:

$$0.01 < |M_{G2}/M_{G3}| < 0.3 \quad (13)$$

where $M_{G2}$ is the amount movement of the second lens unit during zooming from the wide angle end to the telephoto end, and $M_{G3}$ is the amount movement of the third lens unit during zooming from the wide angle end to the telephoto end.

Conditional expression (13) relates to the amounts of movement of the second lens unit and the third lens unit. If the second lens unit moves in such a way that the value of $|M_{G2}/M_{G3}|$ falls within the range defined by conditional expression (13), the second lens unit can also function as a compensator.

It is preferred that the zoom lens according to the present invention be designed in such a way as to satisfy the following conditional expression:

$$2.0 < D_{G23}/D_{G34} < 4.5 \quad (14)$$

where $D_{G23}$ is the distance between the second lens unit and the third lens unit on the optical axis at the wide angle end, and $D_{G34}$ is the distance between the third lens unit and the fourth lens unit on the optical axis at the wide angle end.

Conditional expression (14) relates to the distance between the second lens unit and the third lens unit on the optical axis and the distance between the third lens unit and the fourth lens unit on the optical axis. If the conditional expression (14) is satisfied, the third lens unit can have an appropriate size, and a space needed for allowing zooming toward the telephoto end can be available. If the lower limit of conditional expression (14) is exceeded, the third lens unit is located too close to the object side, and the necessary space cannot be available. If the upper limit of conditional expression (14) is exceeded, the diameter of the third lens unit becomes large. This is undesirable.

It is preferred that the zoom lens according to the present invention be designed in such a way as to satisfy the following conditional expression:

$$6.8 < f_t/f_w < 50.0 \quad (15)$$

where $f_t$ is the focal length of the entire zoom lens system at the telephoto end, and $f_w$ is the focal length of the entire zoom lens system at the wide angle end.

Conditional expression (15) relates to zooming. If the upper limit of conditional expression (15) is exceeded, it becomes difficult to achieve satisfactory optical performance with the zoom lens configuration according to the present invention. If the lower limit of conditional expression (15) is exceeded, the object of the present invention can be achieved with a configuration that is simpler than that of the present invention, and therefore the advantages of the configuration according to the present invention in terms of size and cost cannot be enjoyed.

An image pickup apparatus according to the present invention is characterized by having an image transforming section that transforms, by image processing, an electrical signal representing an image containing distortion attributed to the above-described zoom lens into an image signal representing an image in which distortion is corrected.

It is more preferred that the following modifications of conditional expressions (2) to (4) and (10) to (15) be satisfied.

$$0.5 < P_{w5}/P_{w1} < 1.5 \tag{2'}$$

$$0.8 < P_{w5}/P_{w1} < 1.0 \tag{2''}$$

$$1.0 < D_{G2}/f_w < 1.5 \tag{3'}$$

$$1.2 < D_{G2}/f_w < 1.25 \tag{3''}$$

$$-0.8 < (r_{G1tF} + r_{G1tR})/(r_{G1tF} - r_{G1tR}) < -0.3 \tag{4'}$$

$$-0.7 < (r_{G1tF} + r_{G1tR})/(r_{G1tF} - r_{G1tR}) < -0.5 \tag{4''}$$

$$6.0 < C_j(W)/f_w < 13.0 \tag{10'}$$

$$9.0 < C_j(W)/f_w < 11.0 \tag{10''}$$

$$1.1 < C_j(t)/f_t < 1.9 \tag{11'}$$

$$1.3 < C_j(t)/f_t < 1.5 \tag{11''}$$

$$1.3 < C_j(t)/C_j(w) < 1.6 \tag{12'}$$

$$1.4 < C_j(t)/C_j(w) < 1.5 \tag{12''}$$

$$0.01 < |M_{G2}/M_{G3}| < 0.2 \tag{13'}$$

$$0.01 < |M_{G2}/M_{G3}| < 0.1 \tag{13''}$$

$$2.4 < D_{G23}/D_{G34} < 3.5 \tag{14'}$$

$$2.8 < D_{G23}/D_{G34} < 3.1 \tag{14''}$$

$$8.0 < f_t/f_w < 20.0 \tag{15'}$$

$$9.0 < f_t/f_w < 10.0 \tag{15''}$$

Only the upper limit value or the lower limit value in each conditional expression may be replaced by the upper limit value or lower limit value in the corresponding modified conditional expression.

It is more preferred that two or more of the above described features be adopted at the same time. In each of the more preferred numerical range limitations, limitation by only the upper limit value or the lower limit value may be applied. Furthermore, the various features described above may be adopted in any possible combination.

As described in the foregoing, the zoom lens and the image pickup apparatus according to the present invention can provide an optical system that is sufficiently compact in size and has good optical performance (with good correction of, in particular, on-axis chromatic aberration and chromatic aberration of magnification) while having a high zoom ratio of approximately 10.

In the following, embodiments of the zoom lens and the image pickup apparatus according to the present invention will be described in detail with reference to the drawings. It should be understood, however, that the present invention is not limited by the embodiments.

In the following, first to fifth embodiments of the zoom lens according to the present invention will be described. FIGS. 1A, 1B and 1C to 5A, 5B and 5C are cross sectional views of the zoom lenses according to the first to the fifth embodiments respectively at the wide angle end (FIGS. 1A, 2A, 3A, 4A, and 5A), in an intermediate focal length state (FIGS. 1B, 2B, 3B, 4B, and 5B), and at the telephoto end (FIGS. 1C, 2C, 3C, 4C, and 5C) in the state in which the zoom lenses are focused on an object point at infinity. In FIGS. 1A through 5C, a first lens unit is denoted by G1, a second lens unit is denoted by G2, an aperture stop is denoted by S, a third lens unit is denoted by G3, a fourth lens unit is denoted by G4, a fifth lens unit is denoted by G5, a plane parallel plate having wavelength range restriction coating applied thereon that blocks or reduces infrared light to constitute a low pass filter is denoted by LPF, a plane parallel plate constituting a cover glass for an electronic image pickup element is denoted by CG, and the image plane is denoted by I. The cover glass CG may have multi-layer coating for wavelength range restriction applied on its surface. The cover glass CG may be designed to have the function of a low pass filter.

In all the embodiments, the aperture stop S moves integrally with the third lens unit G3. All the numerical data presented below are for the state in which the zoom lens is focused on an object at infinity. In the numerical data, dimensions are in mm (millimeters) and angles are in degrees. In all the embodiments, focusing is performed by moving the fourth lens unit G4. Zoom data will be presented for the wide angle end (WE), the intermediate focal length state (ST) defined in connection with the present invention, and the telephoto end (TE).

Figure 1B:
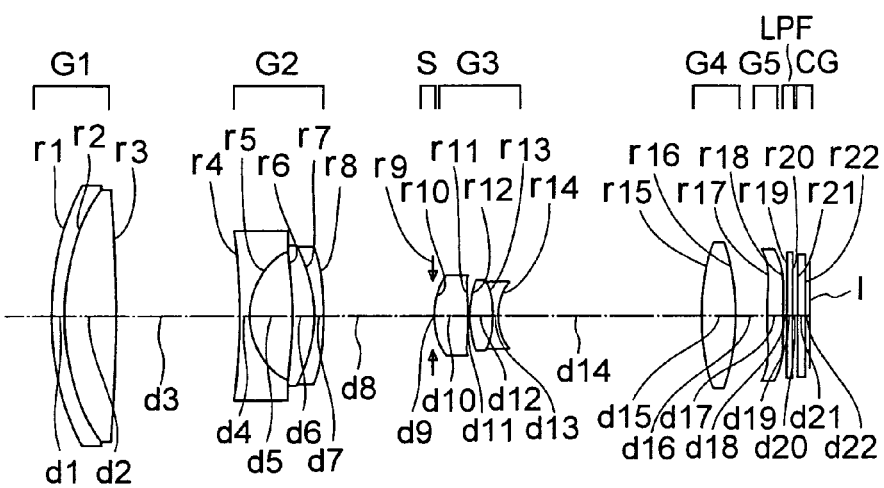
Figure 1C:
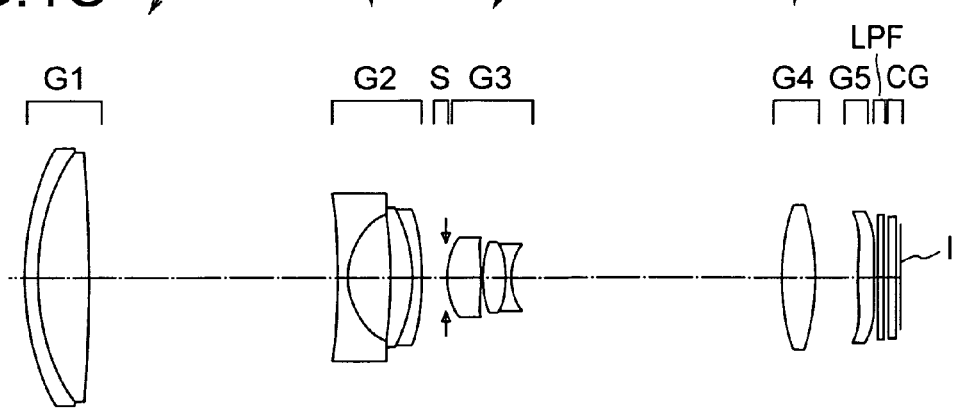

As shown in FIGS. 1A, 1B, and 1C, the zoom lens according to the first embodiment includes, in order from the object side thereof, a first lens unit G1 having a positive refracting power, a second lens unit G2 having a negative refracting power, a third lens unit G3 having a positive refracting power, a fourth lens unit having a positive refracting power, and a fifth lens unit having a positive refracting power.

During zooming from the wide angle end to the telephoto end, the first lens unit G1 moves toward the object side, the second lens unit G2 moves first toward the object side and thereafter toward the image side, the third lens unit G3 moves toward the object side, the fourth lens unit G4 moves first toward the image side and thereafter toward the object side, and the fifth lens unit is kept stationary. Focusing is performed by moving the fourth lens unit G4. Specifically, focusing operation from an object point at a long distance to an object point at a short distance is performed by moving the fourth lens unit G4 toward the object side.

The first lens unit G1 is composed of a cemented lens made up of a negative meniscus lens having a convex surface directed toward the object side and a biconvex positive lens. The second lens unit G2 is composed of a biconcave negative lens, and a cemented lens made up of a positive meniscus lens having a convex surface directed toward the image side and a negative meniscus lens having a convex surface directed toward the image side. The third lens unit G3 is composed of a biconvex positive lens, and a cemented lens made up of a biconvex positive lens and a biconcave negative lens. The fourth lens unit G4 is composed of a biconvex positive lens. The fifth lens unit G5 is composed of a biconvex positive lens. All the lens elements in each lens unit G1, G2, G3, G4, G5 are arranged in the mentioned order from the object side.

The following eight lens surfaces are aspheric surfaces: the image side surface of the biconvex positive lens in the first lens unit G1, the object side surface and the image side surface of the biconcave negative lens in the second lens unit G2, the image side surface of the negative meniscus lens in the second lens unit G2, the object side surface and the image side surface of the biconvex positive lens located closest to the object side in the third lens unit G3, and the object side surface and the image side surface of the biconvex positive lens in the fifth lens unit G5.

Figure 2A:
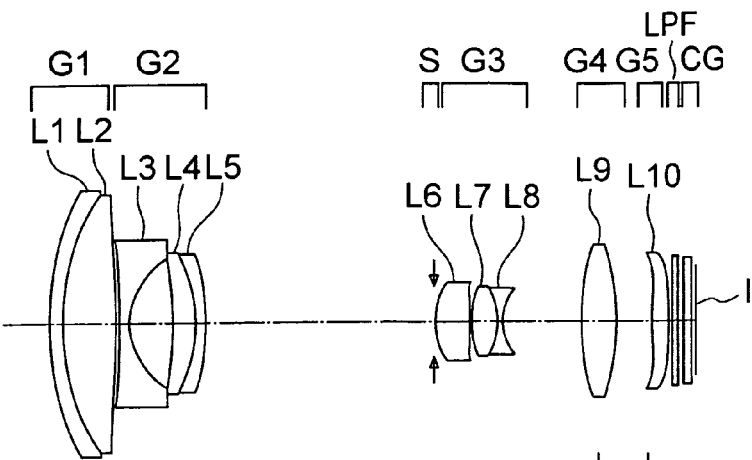
FIGS. 2A, 2B, and 2C are cross sectional views similar to FIGS. 1A, 1B, and 1C showing a zoom lens according to a second embodiment of the present invention.
Figure 2B:
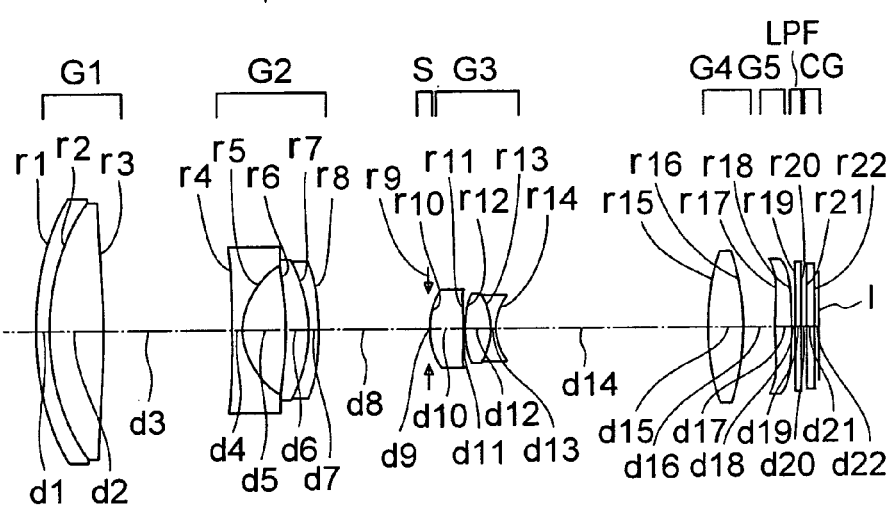
Figure 2C:
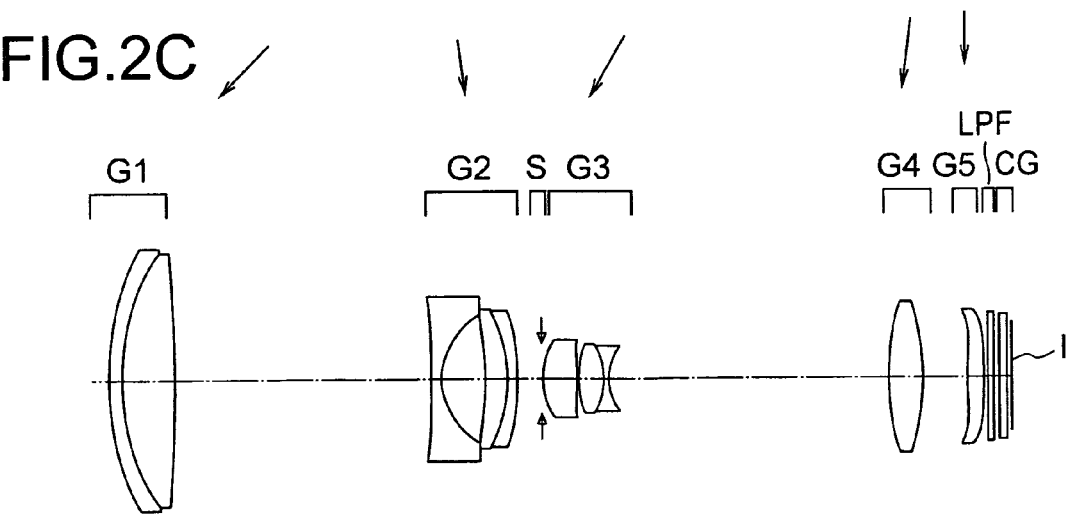

As shown in FIGS. 2A, 2B, and 2C, the zoom lens according to the first embodiment includes, in order from the object side thereof, a first lens unit G1 having a positive refracting power, a second lens unit G2 having a negative refracting power, a third lens unit G3 having a positive refracting power, a fourth lens unit having a positive refracting power, and a fifth lens unit having a positive refracting power.

During zooming from the wide angle end to the telephoto end, the first lens unit G1 moves toward the object side, the second lens unit G2 moves first toward the object side and thereafter toward the image side, the third lens unit G3 moves toward the object side, the fourth lens unit G4 moves first toward the image side and thereafter toward the object side, and the fifth lens unit is kept stationary. Focusing is performed by moving the fourth lens unit G4. Specifically, focusing operation from an object point at a long distance to an object point at a short distance is performed by moving the fourth lens unit G4 toward the object side.

The first lens unit G1 is composed of a cemented lens made up of a negative meniscus lens having a convex surface directed toward the object side and a biconvex positive lens. The second lens unit G2 is composed of a biconcave negative lens, and a cemented lens made up of a positive meniscus lens having a convex surface directed toward the image side and a negative meniscus lens having a convex surface directed toward the image side. The third lens unit G3 is composed of a biconvex positive lens, and a cemented lens made up of a biconvex positive lens and a biconcave negative lens. The fourth lens unit G4 is composed of a biconvex positive lens. The fifth lens unit G5 is composed of a biconvex positive lens. All the lens elements in each lens unit G1, G2, G3, G4, G5 are arranged in the mentioned order from the object side.

The following eight lens surfaces are aspheric surfaces: the image side surface of the biconvex positive lens in the first lens unit G1, the object side surface and the image side surface of the biconcave negative lens in the second lens unit G2, the image side surface of the negative meniscus lens in the second lens unit G2, the object side surface and the image side surface of the biconvex positive lens located closest to the object side in the third lens unit G3, and the object side surface and the image side surface of the biconvex positive lens in the fifth lens unit G5.

Figure 3A:
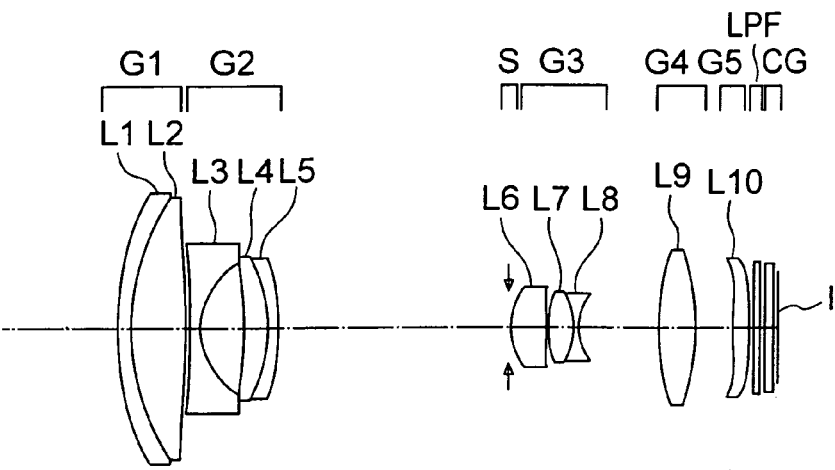
FIGS. 3A, 3B, and 3C are cross sectional views similar to FIGS. 1A, 1B, and 1C showing a zoom lens according to a third embodiment of the present invention.
Figure 3B:
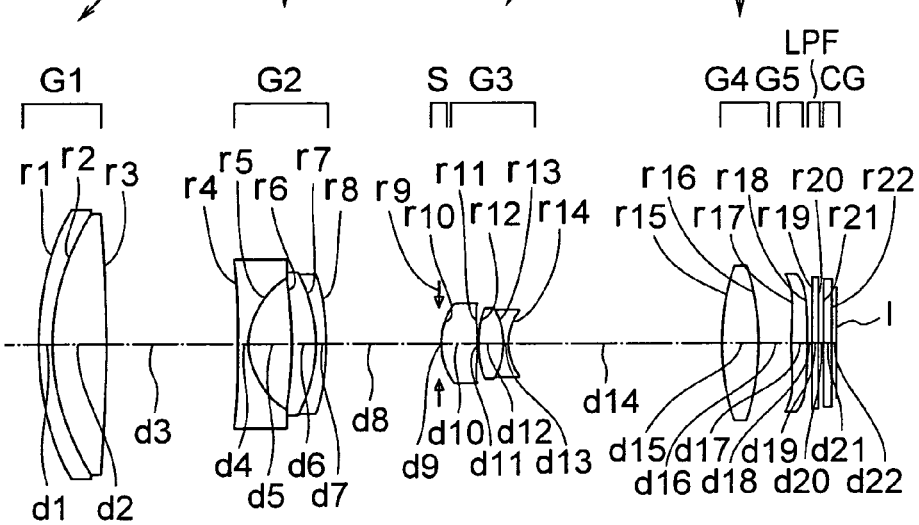
Figure 3C:
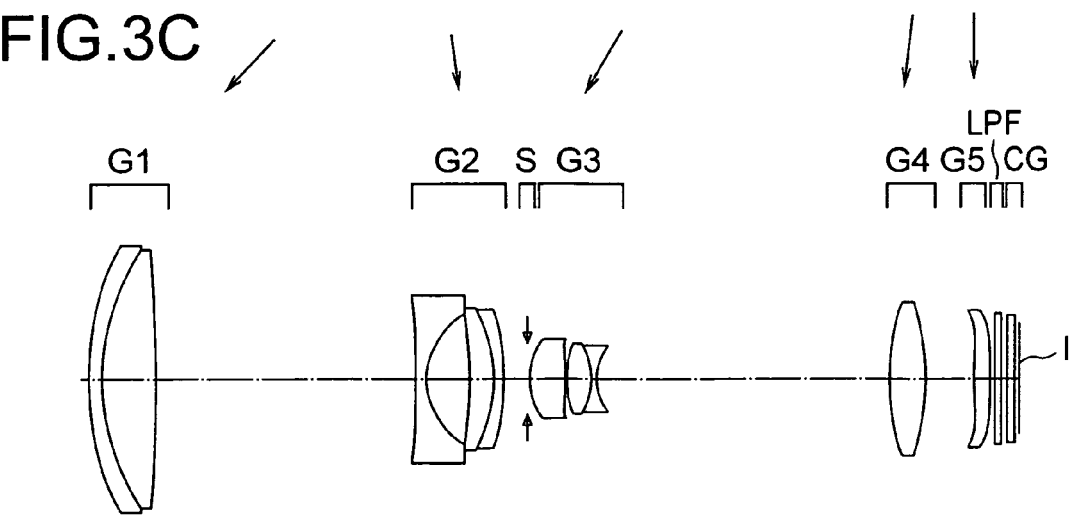

As shown in FIGS. 3A, 3B, and 3C, the zoom lens according to the first embodiment includes, in order from the object side thereof, a first lens unit G1 having a positive refracting power, a second lens unit G2 having a negative refracting power, a third lens unit G3 having a positive refracting power, a fourth lens unit having a positive refracting power, and a fifth lens unit having a positive refracting power.

During zooming from the wide angle end to the telephoto end, the first lens unit G1 moves toward the object side, the second lens unit G2 moves toward the image side, the third lens unit G3 moves toward the object side, the fourth lens unit G4 moves first toward the image side and thereafter toward the object side, and the fifth lens unit is kept stationary. Focusing is performed by moving the fourth lens unit G4. Specifically, focusing operation from an object point at a long distance to an object point at a short distance is performed by moving the fourth lens unit G4 toward the object side.

The first lens unit G1 is composed of a cemented lens made up of a negative meniscus lens having a convex surface directed toward the object side and a biconvex positive lens. The second lens unit G2 is composed of a negative meniscus lens having a convex surface directed toward the object side, and a cemented lens made up of a positive meniscus lens having a convex surface directed toward the image side and a negative meniscus lens having a convex surface directed toward the image side. The third lens unit G3 is composed of a biconvex positive lens, and a cemented lens made up of a biconvex positive lens and a biconcave negative lens. The fourth lens unit G4 is composed of a biconvex positive lens. The fifth lens unit G5 is composed of a biconvex positive lens. All the lens elements in each lens unit G1, G2, G3, G4, G5 are arranged in the mentioned order from the object side.

The following six lens surfaces are aspheric surfaces: the image side surface of the biconvex positive lens in the first lens unit G1, the object side surface and the image side surface of the negative meniscus lens having a convex surface directed toward the object side in the second lens unit G2, the image side surface of the negative meniscus lens in the second lens unit G2, and the object side surface and the image side surface of the biconvex positive lens located closest to the object side in the third lens unit G3.

Figure 4A:
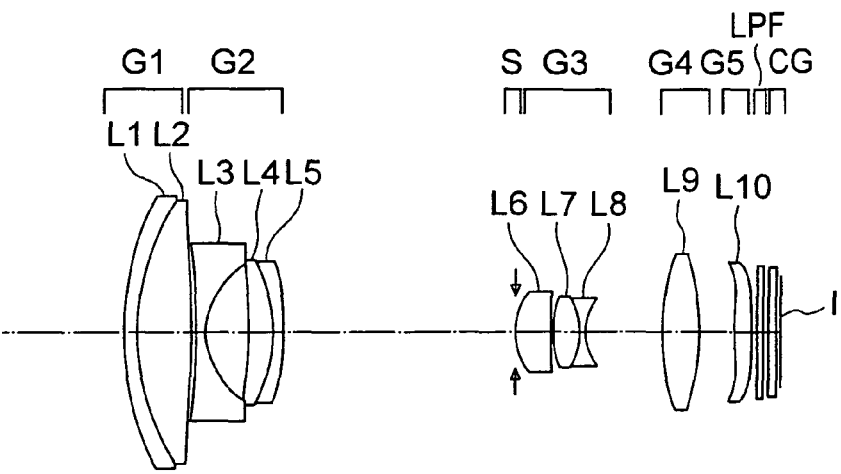
FIGS. 4A, 4B, and 4C are cross sectional views similar to FIGS. 1A, 1B, and 1C showing a zoom lens according to a fourth embodiment of the present invention.
Figure 4B:
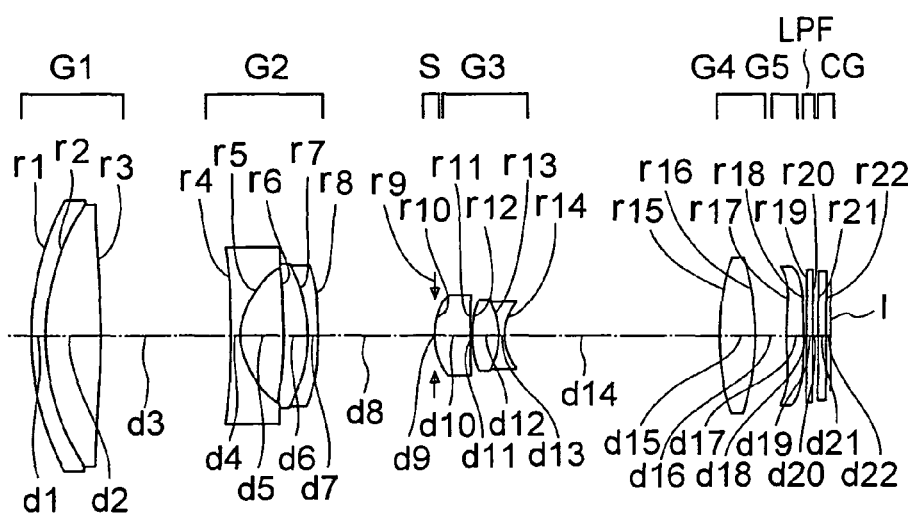
Figure 4C:
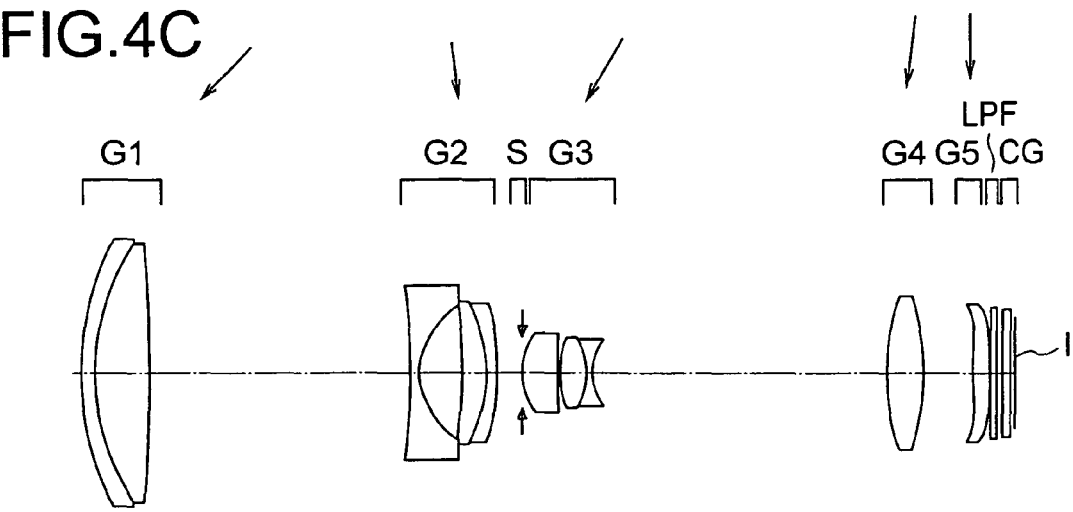

As shown in FIGS. 4A, 4B, and 4C, the zoom lens according to the first embodiment includes, in order from the object side thereof, a first lens unit G1 having a positive refracting power, a second lens unit G2 having a negative refracting power, a third lens unit G3 having a positive refracting power, a fourth lens unit having a positive refracting power, and a fifth lens unit having a positive refracting power.

During zooming from the wide angle end to the telephoto end, the first lens unit G1 moves toward the object side, the second lens unit G2 moves toward the image side, the third lens unit G3 moves toward the object side, the fourth lens unit G4 moves first toward the image side and thereafter toward the object side, and the fifth lens unit is kept stationary. Focusing is performed by moving the fourth lens unit G4. Specifically, focusing operation from an object point at a long distance to an object point at a short distance is performed by moving the fourth lens unit G4 toward the object side.

The first lens unit G1 is composed of a cemented lens made up of a negative meniscus lens having a convex surface directed toward the object side and a biconvex positive lens. The second lens unit G2 is composed of a negative meniscus lens having convex surface directed toward the object side, and a cemented lens made up of a positive meniscus lens having a convex surface directed toward the image side and a negative meniscus lens having a convex surface directed toward the image side. The third lens unit G3 is composed of a biconvex positive lens, and a cemented lens made up of a biconvex positive lens and a biconcave negative lens. The fourth lens unit G4 is composed of a biconvex positive lens. The fifth lens unit G5 is composed of a biconvex positive lens. All the lens elements in each lens unit G1, G2, G3, G4, G5 are arranged in the mentioned order from the object side.

The following eight lens surfaces are aspheric surfaces: the image side surface of the biconvex positive lens in the first lens unit G1, the object side surface and the image side surface of the negative meniscus lens located closest to the object side in the second lens unit G2, the image side surface of the negative meniscus lens located closest to the image side in the second lens unit G2, the object side surface and the image side surface of the biconvex positive lens located closest to the object side in the third lens unit G3, and the object side surface and the image side surface of the biconvex positive lens in the fifth lens unit G5.

Figure 5A:
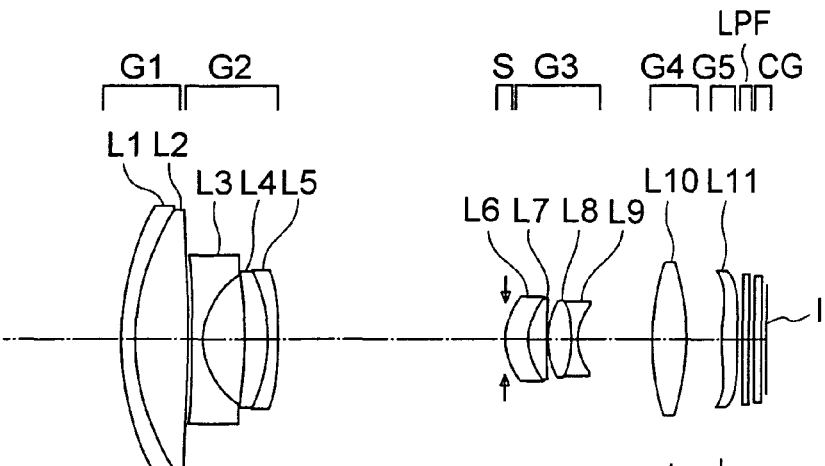
FIGS. 5A, 5B, and 5C are cross sectional views similar to FIGS. 1A, 1B, and 1C showing a zoom lens according to a fifth embodiment of the present invention.
Figure 5B:
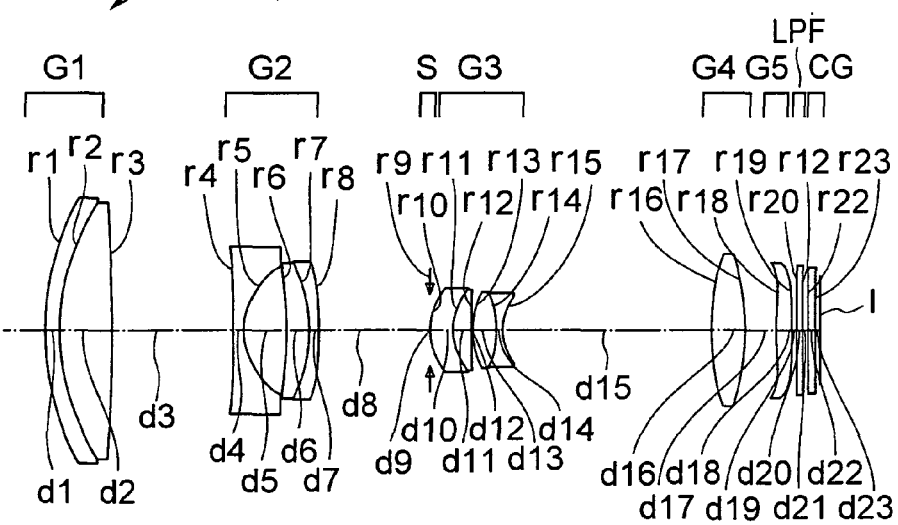
Figure 5C:
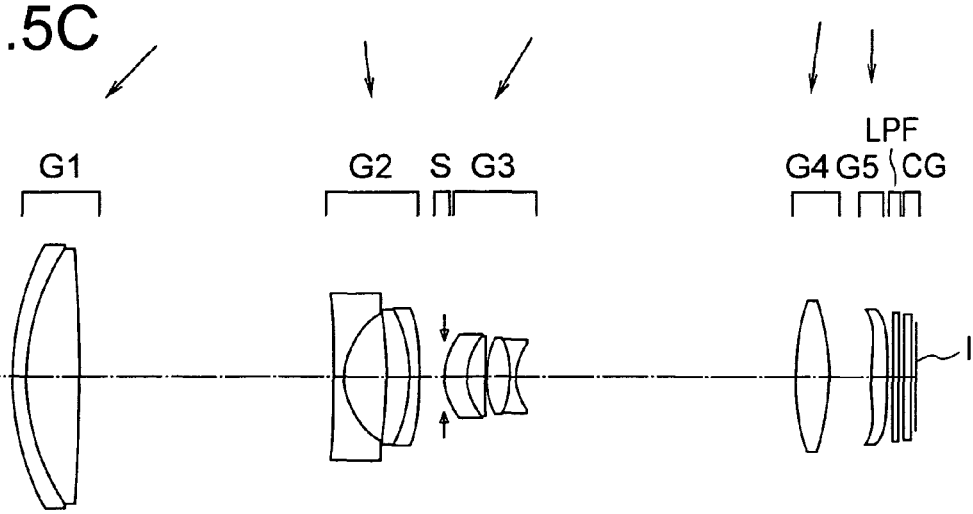
Figure 6A:
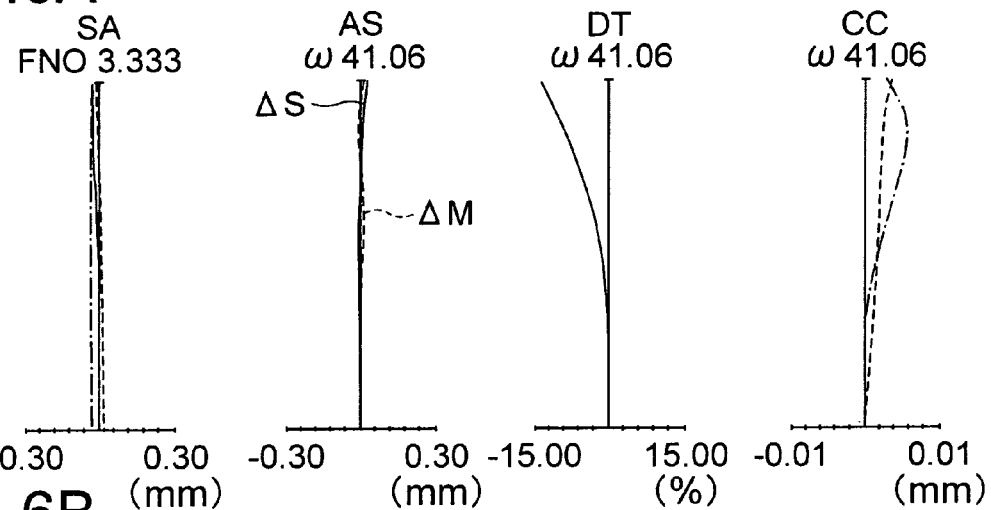
FIGS. 6A, 6B, and 6C are aberration diagrams of the first embodiment in the state in which the zoom lens is focused on an object point at infinity.
Figure 6B:
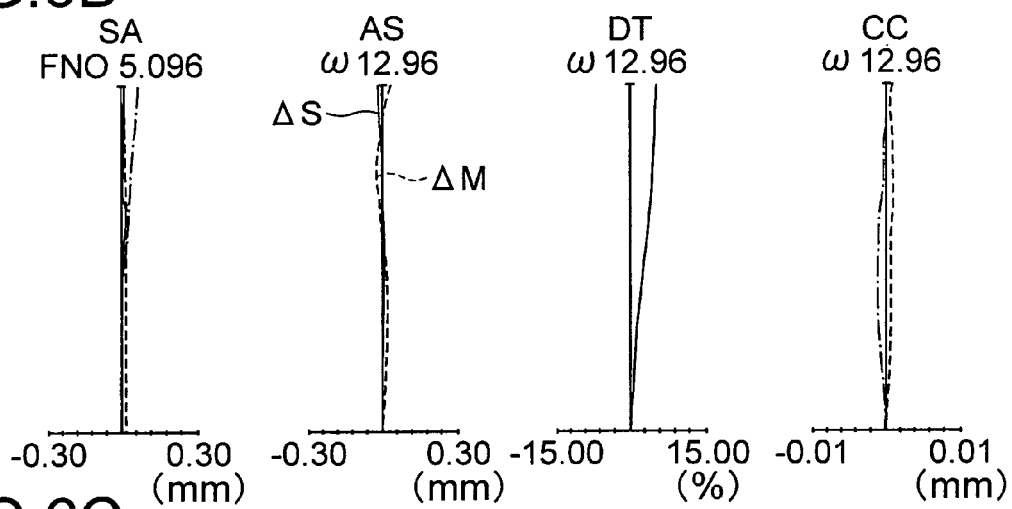
Figure 6C:
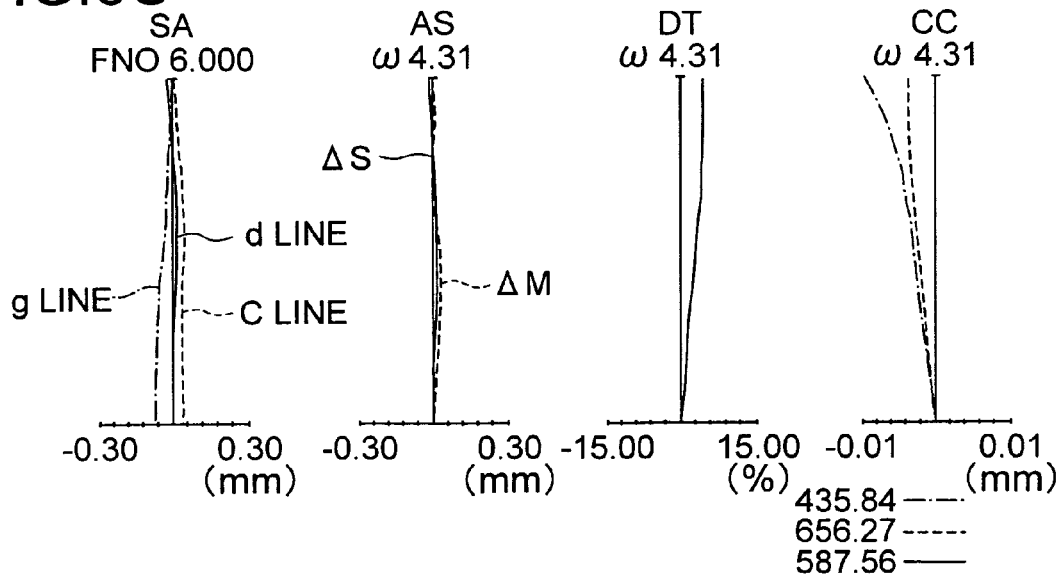
Figure 7A:
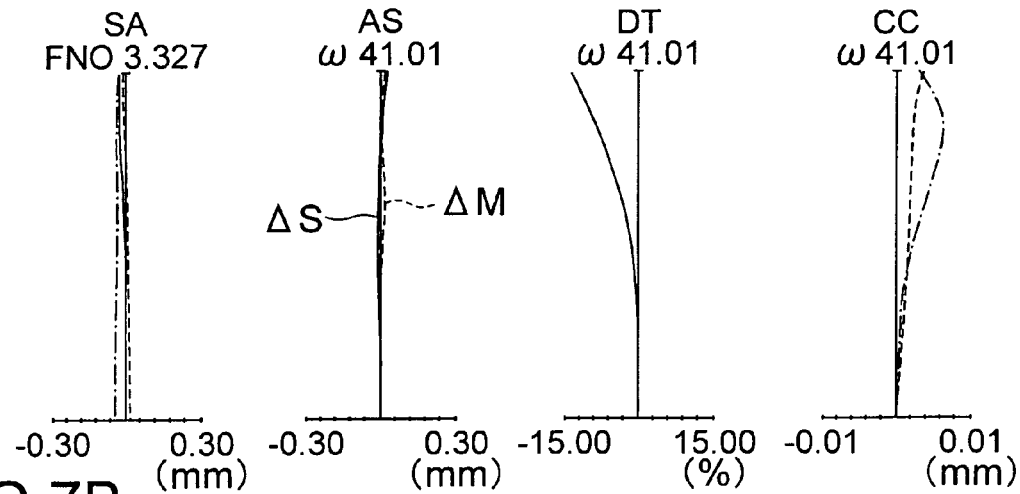
FIGS. 7A, 7B, and 7C are aberration diagrams of the second embodiment in the state in which the zoom lens is focused on an object point at infinity.
Figure 7B:
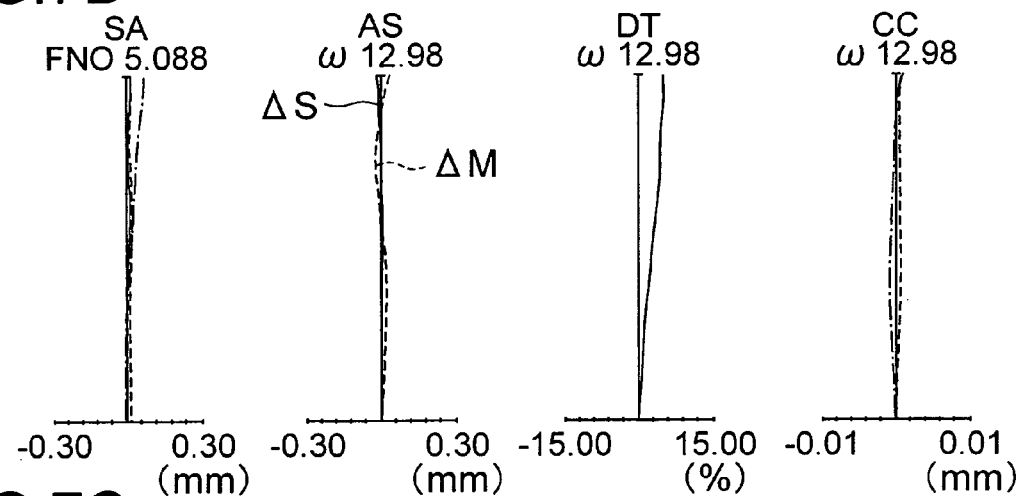
Figure 7C:
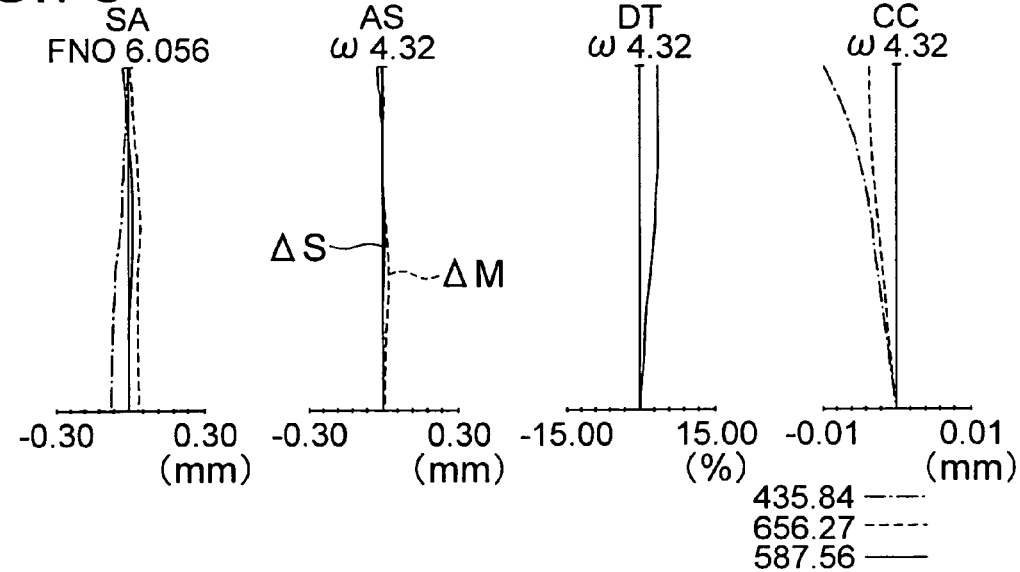
Figure 8A:
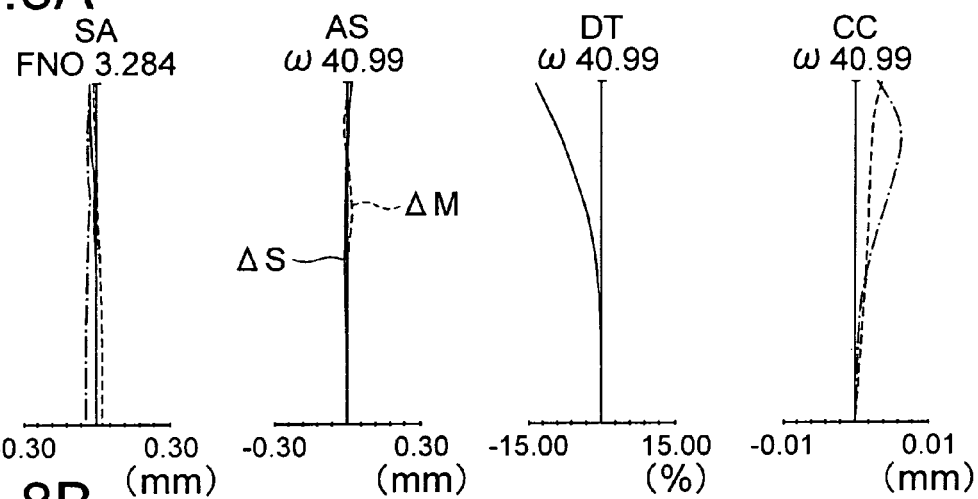
FIGS. 8A, 8B, and 8C are aberration diagrams of the third embodiment in the state in which the zoom lens is focused on an object point at infinity.
Figure 8B:
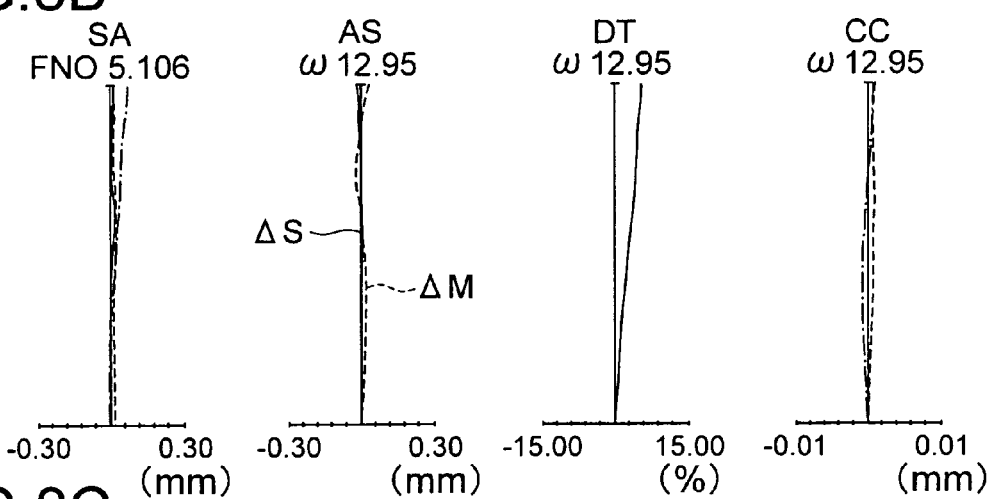
Figure 8C:
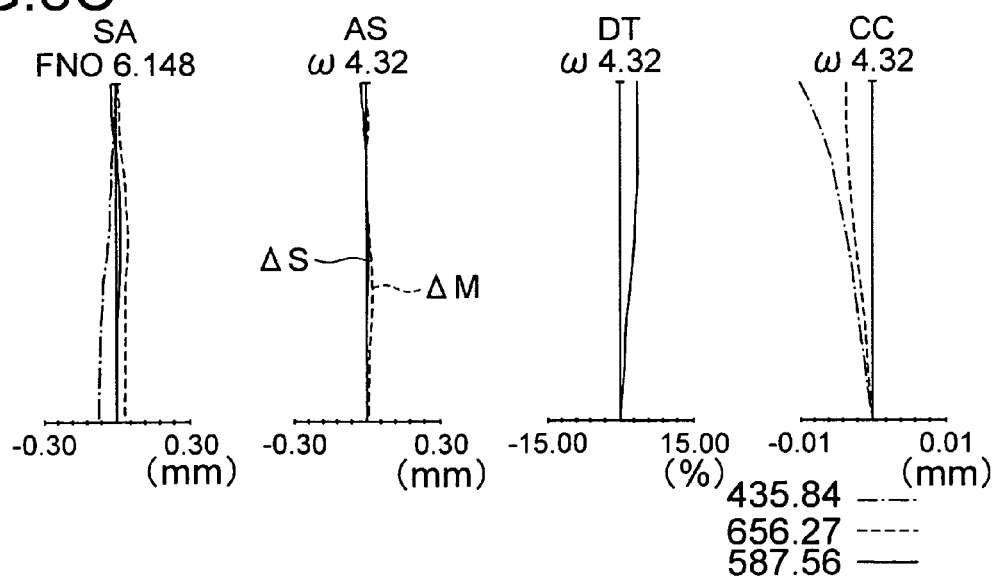
Figure 9A:
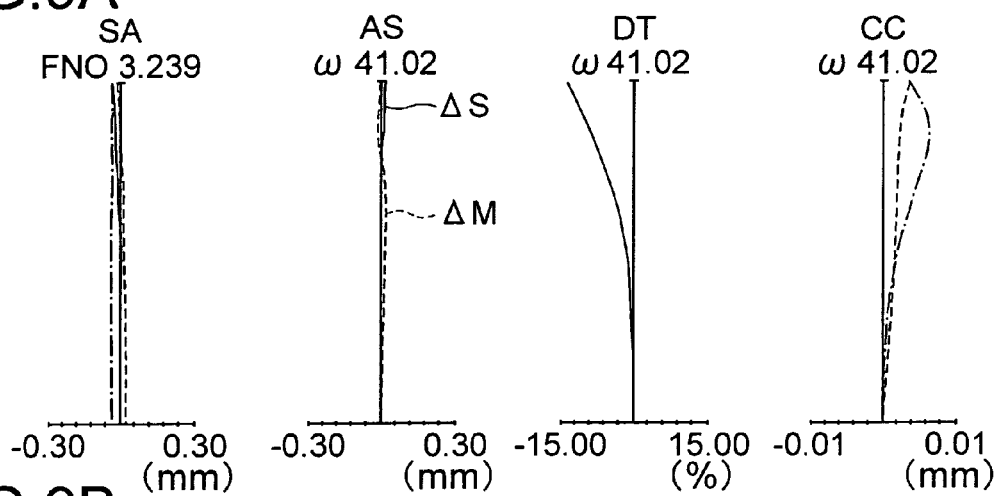
FIGS. 9A, 9B, and 9C are aberration diagrams of the fourth embodiment in the state in which the zoom lens is focused on an object point at infinity.
Figure 9B:
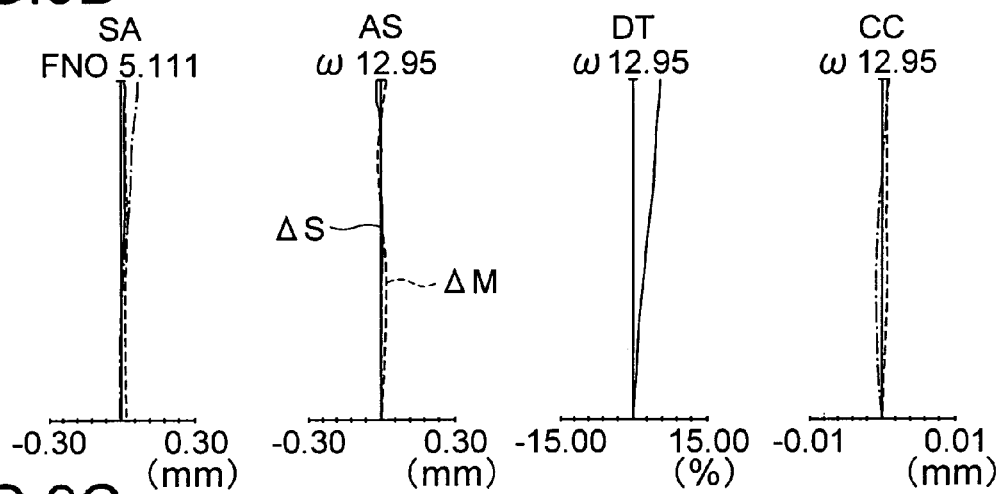
Figure 9C:
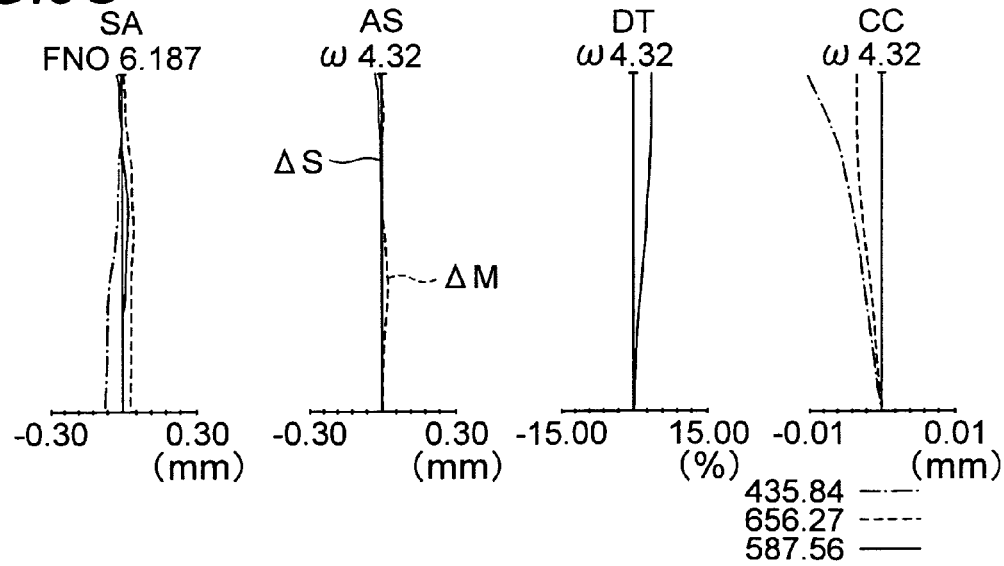
Figure 10A:
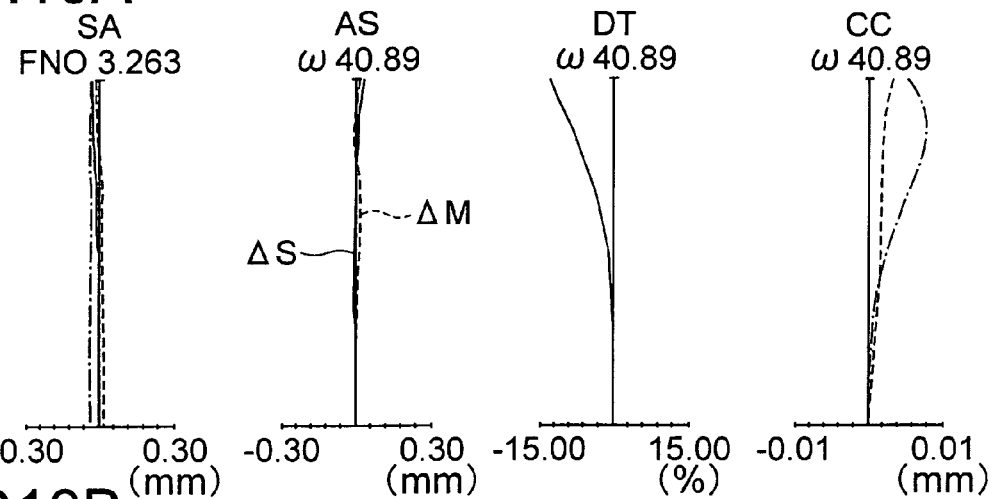
FIGS. 10A, 10B, and 10C are aberration diagrams of the fifth embodiment in the state in which the zoom lens is focused on an object point at infinity.
Figure 10B:
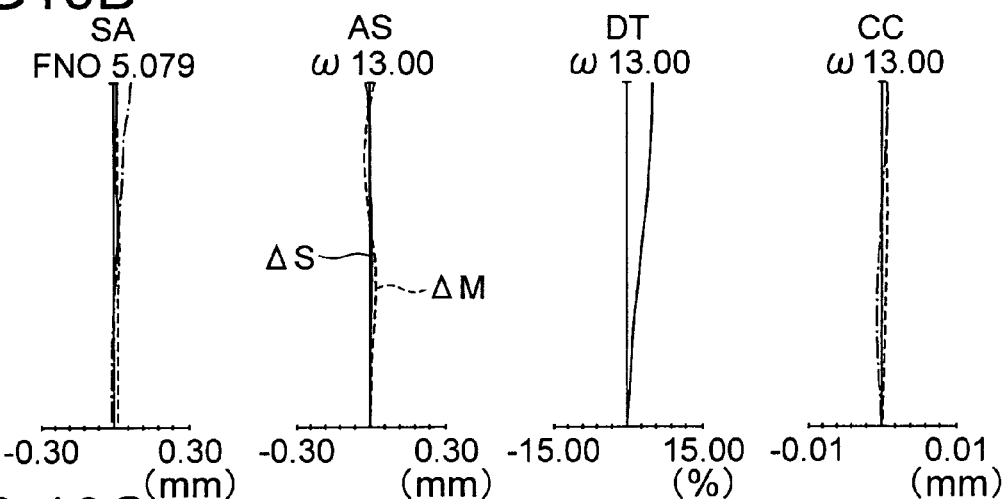
Figure 10C:
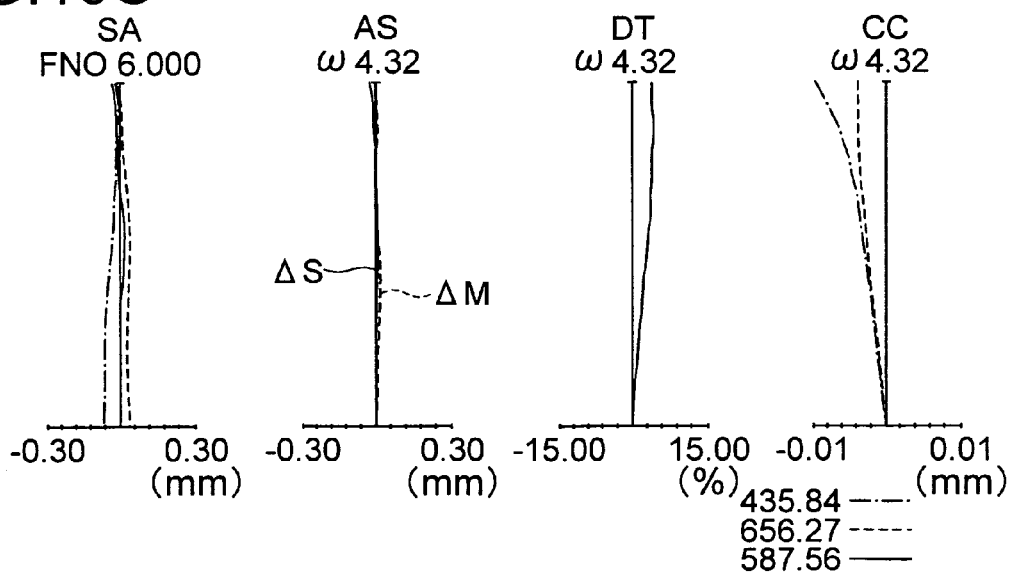

As shown in FIGS. 5A, 5B, and 5C, the zoom lens according to the first embodiment includes, in order from the object side thereof, a first lens unit G1 having a positive refracting power, a second lens unit G2 having a negative refracting power, a third lens unit G3 having a positive refracting power, a fourth lens unit having a positive refracting power, and a fifth lens unit having a positive refracting power.

During zooming from the wide angle end to the telephoto end, the first lens unit G1 moves toward the object side, the second lens unit G2 moves toward the image side, the third lens unit G3 moves toward the object side, the fourth lens unit G4 moves first toward the image side and thereafter toward the object side, and the fifth lens unit is kept stationary. Focusing is performed by moving the fourth lens unit G4. Specifically, focusing operation from an object point at a long distance to an object point at a short distance is performed by moving the fourth lens unit G4 toward the object side.

The first lens unit G1 is composed of a cemented lens made up of a negative meniscus lens having a convex surface directed toward the object side and a biconvex positive lens. The second lens unit G2 is composed of a biconcave negative lens, and a cemented lens made up of a positive meniscus lens having a convex surface directed toward the image side and a negative meniscus lens having a convex surface directed toward the image side. The third lens unit G3 is composed of a cemented lens made up of a negative meniscus lens having a convex surface directed toward the object side and biconvex positive lens, and a cemented lens made up of a biconvex positive lens and a biconcave negative lens. The fourth lens unit G4 is composed of a biconvex positive lens. The fifth lens unit G5 is composed of a biconvex positive lens. All the lens elements in each lens unit G1, G2, G3, G4, G5 are arranged in the mentioned order from the object side.

The following eight lens surfaces are aspheric surfaces: the image side surface of the biconvex positive lens in the first lens unit G1, the object side surface and the image side surface of the biconcave negative lens in the second lens unit G2, the image side surface of the negative meniscus lens in the second lens unit G2, the object side surface of the negative meniscus lens in the third lens unit G3, the image side surface of the biconvex positive lens located closest to the object side among the biconvex positive lenses in the third lens unit G3, and the object side surface and the image side surface of the biconvex positive lens in the fifth lens unit G5.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further "A" means that the surface is an aspheric surface, and "S" means that the surface is an aperture stop.

Example 1

| unit mm | | | | |
|---|---|---|---|---|
| Surface data | | | | |
| Surface No | r | d | nd | vd |
| Object plane | ∞ | ∞ | | |
| 1 | 22.880 | 1.00 | 1.92286 | 20.88 |
| 2 | 18.175 | 3.90 | 1.59201 | 67.02 |
| 3* | −99.663 | Variable | | |
| 4* | −1218.302 | 0.80 | 1.85135 | 40.10 |
| 5* | 5.411 | 3.10 | | |
| 6 | −37.750 | 1.72 | 1.94595 | 17.98 |
| 7 | −11.516 | 0.70 | 1.86400 | 40.58 |
| 8* | −33.269 | Variable | | |
| 9 (S) | ∞ | 0.00 | | |
| 10* | 5.354 | 2.64 | 1.58313 | 59.46 |
| 11* | −36.258 | 0.10 | | |
| 12 | 7.514 | 1.80 | 1.49700 | 81.54 |
| 13 | −6.197 | 0.44 | 1.60342 | 38.03 |
| 14 | 4.047 | Variable | | |
| 15 | 19.124 | 2.62 | 1.49700 | 81.54 |
| 16 | −17.629 | Variable | | |
| 17* | 46.247 | 1.20 | 1.52540 | 55.78 |
| 18* | −43.739 | 0.30 | | |
| 19 | ∞ | 0.40 | 1.51633 | 64.14 |
| 20 | ∞ | 0.50 | | |
| 21 | ∞ | 0.50 | 1.51633 | 64.14 |
| 22 | ∞ | 0.37 | | |
| Image plane | ∞ | | | |

Aspherical coefficients

3rd surface

K = 0.000, A4 = 1.03804e−05, A6 = −1.02698e−08, A8 = −8.00039e−12, A10 = 1.50912e−15

4th surface

K = 0.000, A4 = −4.52213e−04, A6 = 8.56273e−06, A8 = −5.56902e−08, A10 = −1.94709e−10, A12 = 4.88514e−12

5th surface

K = 0.000, A4 = −5.70574e−04, A6 = −1.64501e−05, A8 = 1.28041e−06, A10 = −7.59310e−08, A12 = 1.11182e−09

8th surface

K = 0.000, A4 = −2.75387e−04, A6 = −7.56940e−07, A8 = −3.28406e−07, A10 = 2.12073e−08, A12 = −5.44677e−10

10th surface

K = 0.000, A4 = 8.55249e−05, A6 = −3.58589e−06, A8 = 8.91690e−06, A10 = −8.43495e−07, A12 = 5.33160e−08

11th surface

K = 0.000, A4 = 1.13563e−03, A6 = 1.32759e−05, A8 = 1.21566e−05, A10 = −8.66874e−07, A12 = 7.53339e−08

17th surface

K = 0.000, A4 = −6.75878e−04, A6 = 3.47904e−05, A8 = −3.62323e−06, A10 = 6.43945e−08

18th surface

K = 0.000, A4 = 1.33179e−03, A6 = −1.05913e−04, A8 = 8.70045e−08, A10 = 3.74188e−08

-continued unit mm

Zoom data

| | WE | ST | TE |
|---|---|---|---|
| IH | 3.84 | 3.84 | 3.84 |
| focal length | 5.10 | 15.80 | 48.87 |
| Fno. | 3.33 | 5.10 | 6.00 |
| 2ω (°) | 82.12 | 25.92 | 8.62 |
| BF | 1.76 | 1.76 | 1.76 |
| total length | 47.69 | 57.68 | 66.69 |
| d3 | 0.30 | 9.40 | 18.97 |
| d8 | 16.96 | 8.46 | 1.90 |
| d14 | 5.94 | 15.64 | 20.80 |
| d16 | 2.71 | 2.40 | 3.24 | unit focal length

| f1 = 35.71 | f2 = −7.21 | f3 = 12.03 | f4 = 18.90 | f5 = 42.98 |
|---|---|---|---|---|

Example 2 unit mm

Surface data

| Surface No | r | d | nd | vd |
|---|---|---|---|---|
| Object plane | ∞ | ∞ | | |
| 1 | 22.769 | 1.00 | 1.92286 | 20.88 |
| 2 | 18.083 | 3.90 | 1.59201 | 67.02 |
| 3* | −101.321 | Variable | | |
| 4* | −56120.752 | 0.80 | 1.85135 | 40.10 |
| 5* | 5.378 | 3.10 | | |
| 6 | −39.786 | 1.72 | 1.94595 | 17.98 |
| 7 | −11.667 | 0.70 | 1.86400 | 40.58 |
| 8* | −34.361 | Variable | | |
| 9 (S) | ∞ | 0.00 | | |
| 10* | 5.346 | 2.64 | 1.58313 | 59.46 |
| 11* | −36.165 | 0.10 | | |
| 12 | 7.526 | 1.80 | 1.49700 | 81.54 |
| 13 | −6.170 | 0.44 | 1.60342 | 38.03 |
| 14 | 4.042 | Variable | | |
| 15 | 19.114 | 2.62 | 1.49700 | 81.54 |
| 16 | −17.759 | Variable | | |
| 17* | 46.247 | 1.20 | 1.49700 | 81.54 |
| 18* | −40.056 | 0.30 | | |
| 19 | ∞ | 0.40 | 1.51633 | 64.14 |
| 20 | ∞ | 0.50 | | |
| 21 | ∞ | 0.50 | 1.51633 | 64.14 |
| 22 | ∞ | 0.37 | | |
| Image plane | ∞ | | | |

Aspherical coefficients

3rd surface

K = 0.000, A4 = 1.03539e−05, A6 = −9.57340e−09, A8 = −1.81668e−11, A10 = 5.24064e−14
4th surface K = 0.000, A4 = −4.61876e−04, A6 = 8.74262e−06, A8 = −5.44739e−08, A10 = −2.04947e−10, A12 = 4.54485e−12
5th surface K = 0.000, A4 = −5.83876e−04, A6 = −1.71899e−05, A8 = 1.28991e−06, A10 = −7.68821e−08, A12 = 1.14268e−09
8th surface K = 0.000, A4 = −2.78935e−04, A6 = −8.14486e−07, A8 = −3.16386e−07, A10 = 2.10119e−08, A12 = −5.58487e−10

-continued unit mm

10th surface

K = 0.000, A4 = 8.47519e−05, A6 = −3.87995e−06, A8 = 8.96763e−06, A10 = −8.51231e−07, A12 = 5.42333e−08
11th surface K = 0.000, A4 = 1.13953e−03, A6 = 1.31784e−05, A8 = 1.20834e−05, A10 = −8.57713e−07, A12 = 7.70524e−08
17th surfac K = 0.000, A4 = −6.75878e−04, A6 = 3.47904e−05, A8 = −3.62323e−06, A10 = 6.43945e−08
18th surface K = 0.000, A4 = 1.33179e−03, A6 = −1.05913e−04, A8 = 8.70045e−08, A10 = 3.74188e−08

Zoom data

| | WE | ST | TE |
|---|---|---|---|
| IH | 3.84 | 3.84 | 3.84 |
| focal length | 5.10 | 15.80 | 48.86 |
| Fno. | 3.33 | 5.09 | 6.06 |
| 2ω (°) | 82.02 | 25.96 | 8.64 |
| BF | 1.76 | 1.76 | 1.76 |
| total length | 47.69 | 57.63 | 66.69 |
| d3 | 0.30 | 9.38 | 18.91 |
| d8 | 17.01 | 8.48 | 1.90 |
| d14 | 5.89 | 15.58 | 20.81 |
| d16 | 2.71 | 2.40 | 3.29 |

Unit focal length

| f1 = 35.69 | f2 = −7.22 | f3 = 12.03 | f4 = 18.97 | f5 = 43.39 |
|---|---|---|---|---|

Example 3 unit mm

Surface data

| Surface No | r | d | nd | vd |
|---|---|---|---|---|
| Object plane | ∞ | ∞ | | |
| 1 | 23.311 | 1.00 | 1.92286 | 20.88 |
| 2 | 18.484 | 3.90 | 1.59201 | 67.02 |
| 3* | −94.596 | Variable | | |
| 4* | 6068.015 | 0.80 | 1.85135 | 40.10 |
| 5* | 5.384 | 3.10 | | |
| 6 | −40.473 | 1.72 | 1.94595 | 17.98 |
| 7 | −11.691 | 0.70 | 1.86400 | 40.58 |
| 8* | −35.085 | Variable | | |
| 9 (S) | ∞ | 0.00 | | |
| 10* | 5.344 | 2.66 | 1.58313 | 59.46 |
| 11* | −36.178 | 0.10 | | |
| 12 | 7.608 | 1.76 | 1.49700 | 81.54 |
| 13 | −6.207 | 0.50 | 1.60342 | 38.03 |
| 14 | 4.052 | Variable | | |
| 15 | 18.403 | 2.71 | 1.49700 | 81.54 |
| 16 | −18.642 | Variable | | |
| 17* | 46.247 | 1.20 | 1.49700 | 81.54 |
| 18* | −37.893 | 0.30 | | |
| 19 | ∞ | 0.40 | 1.51633 | 64.14 |
| 20 | ∞ | 0.50 | | |
| 21 | ∞ | 0.50 | 1.51633 | 64.14 |
| 22 | ∞ | 0.37 | | |
| Image plane | ∞ | | | |

-continued

| unit mm | | | | |
|---|---|---|---|---|
| Aspherical coefficients | | | | |

3rd surface

K = 0.000, A4 = 1.02923e−05, A6 = −7.65535e−09, A8 = −3.76680e−11, A10 = 1.18482e−13

4th surface

K = 0.000, A4 = −4.67586e−04, A6 = 8.42186e−06, A8 = −4.77011e−08, A10 = −1.45532e−10, A12 = 3.01974e−12

5th surface

K = 0.000, A4 = −5.90182e−04, A6 = −1.81768e−05, A8 = 1.29897e−06, A10 = −7.86655e−08, A12 = 1.18153e−09

8th surface

K = 0.000, A4 = −2.79496e−04, A6 = −6.29157e−07, A8 = −3.19088e−07, A10 = 2.12719e−08, A12 = −5.57928e−10

10th surface

K = 0.000, A4 = 8.26977e−05, A6 = −4.14285e−06, A8 = 9.03688e−06, A10 = −8.61447e−07, A12 = 5.45347e−08

11th surface

K = 0.000, A4 = 1.14367e−03, A6 = 1.37227e−05, A8 = 1.20181e−05, A10 = −8.74882e−07, A12 = 8.10614e−08

17th surface

K = 0.000, A4 = −6.75878e−04, A6 = 3.47904e−05, A8 = −3.62323e−06, A10 = 6.43945e−08

18th surface

K = 0.000, A4 = 1.33179e−03, A6 = −1.05913e−04, A8 = 8.70045e−08, A10 = 3.74188e−08

| Zoom data | | | |
|---|---|---|---|
|  | WE | ST | TE |
| IH | 3.84 | 3.84 | 3.84 |
| focal length | 5.10 | 15.80 | 48.87 |
| Fno. | 3.28 | 5.11 | 6.15 |
| 2ω (°) | 81.97 | 25.90 | 8.65 |
| BF | 1.76 | 1.76 | 1.76 |
| total length | 47.71 | 57.88 | 67.68 |
| d3 | 0.30 | 9.45 | 18.95 |
| d8 | 16.97 | 8.50 | 1.90 |
| d14 | 5.81 | 15.60 | 21.34 |
| d16 | 2.71 | 2.40 | 3.57 |

| Unit focal length | | | | |
|---|---|---|---|---|
| f1 = 35.91 | f2 = −7.22 | f3 = 12.03 | f4 = 19.10 | f5 = 42.11 |

Example 4

| unit mm | | | | |
|---|---|---|---|---|
| Surface data | | | | |
| Surface No | r | d | nd | vd |
| Object plane | ∞ | ∞ | | |
| 1 | 23.389 | 1.00 | 1.92286 | 20.88 |
| 2 | 18.523 | 3.90 | 1.59201 | 67.02 |
| 3* | −93.497 | Variable | | |
| 4* | 13235.321 | 0.80 | 1.85135 | 40.10 |
| 5 | 5.385 | 3.10 | | |
| 6 | −39.966 | 1.74 | 1.94595 | 17.98 |
| 7 | −11.693 | 0.70 | 1.86400 | 40.58 |
| 8* | −34.496 | Variable | | |
| 9 (S) | ∞ | 0.00 | | |
| 10* | 5.342 | 2.66 | 1.58313 | 59.46 |
| 11* | −36.747 | 0.10 | | |
| 12 | 7.585 | 1.76 | 1.49700 | 81.54 |
| 13 | −6.228 | 0.50 | 1.60342 | 38.03 |
| 14 | 4.054 | Variable | | |
| 15 | 17.846 | 2.65 | 1.49700 | 81.54 |
| 16 | −19.636 | Variable | | |
| 17* | 46.247 | 1.20 | 1.49700 | 81.54 |
| 18* | −35.337 | 0.42 | | |
| 19 | ∞ | 0.40 | 1.51633 | 64.14 |
| 20 | ∞ | 0.50 | | |
| 21 | ∞ | 0.50 | 1.51633 | 64.14 |
| 22 | ∞ | 0.37 | | |
| Image plane | ∞ | | | |

| Aspherical coefficients | | | | |
|---|---|---|---|---|

3rd surface

K = 0.000, A4 = 1.02817e−05, A6 = −8.34120e−09, A8 = −3.81883e−11, A10 = 1.71304e−13

4th surface

K = 0.000, A4 = −4.69911e−04, A6 = 8.36618e−06, A8 = −4.87578e−08, A10 = −1.41364e−10, A12 = 3.87392e−12

5th surface

K = 0.000, A4 = −5.89293e−04, A6 = −1.90206e−05, A8 = 1.29241e−06, A10 = −7.81954e−08, A12 = 1.16011e−09

8th surface

K = 0.000, A4 = −2.77603e−04, A6 = −7.16245e−07, A8 = −3.19527e−07, A10 = 2.13782e−08, A12 = −5.51311e−10

10th surface

K = 0.000, A4 = 8.22489e−05, A6 = −4.20672e−06, A8 = 9.04912e−06, A10 = −8.60393e−07, A12 = 5.45347e−08

11th surface

K = 0.000, A4 = 1.14333e−03, A6 = 1.39189e−05, A8 = 1.20206e−05, A10 = −8.71224e−07, A12 = 8.10614e−08

17th surface

K = 0.000, A4 = −6.75878e−04, A6 = 3.47904e−05, A8 = −3.62323e−06, A10 = 6.43945e−08

18th surface

K = 0.000, A4 = 1.33179e−03, A6 = −1.05913e−04, A8 = 8.70045e−08, A10 = 3.74188e−08

| Zoom data | | | |
|---|---|---|---|
|  | WE | ST | TE |
| IH | 3.84 | 3.84 | 3.84 |
| focal length | 5.10 | 15.80 | 48.87 |
| Fno. | 3.24 | 5.11 | 6.19 |
| 2ω (°) | 82.03 | 25.90 | 8.65 |
| BF | 1.89 | 1.66 | 1.58 |
| total length | 47.40 | 57.79 | 67.59 |
| d3 | 0.30 | 9.46 | 18.93 |
| d8 | 16.73 | 8.51 | 1.90 |
| d14 | 5.67 | 15.60 | 21.38 |
| d16 | 2.70 | 2.44 | 3.68 |

| Unit focal length | | | | |
|---|---|---|---|---|
| f1 = 35.94 | f2 = −7.23 | f3 = 12.02 | f4 = 19.26 | f5 = 40.50 |

Example 5 unit mm

Surface data

| Surface No | r | d | nd | νd |
|---|---|---|---|---|
| Object plane | ∞ | ∞ | | |
| 1 | 22.700 | 1.00 | 1.92286 | 20.88 |
| 2 | 18.012 | 3.90 | 1.59201 | 67.02 |
| 3* | −102.764 | Variable | | |
| 4* | −8030.030 | 0.80 | 1.85135 | 40.10 |
| 5* | 5.388 | 3.10 | | |
| 6 | −40.199 | 1.72 | 1.94595 | 17.98 |
| 7 | −11.633 | 0.70 | 1.86400 | 40.58 |
| 8* | −34.847 | Variable | | |
| 9 (S) | ∞ | 0.00 | | |
| 10* | 5.354 | 1.60 | 1.58313 | 59.46 |
| 11 | 5.033 | 1.30 | 1.58421 | 60.80 |
| 12* | −41.162 | 0.10 | | |
| 13 | 7.397 | 1.80 | 1.49700 | 81.54 |
| 14 | −6.139 | 0.44 | 1.60342 | 38.03 |
| 15 | 4.076 | Variable | | |
| 16 | 20.782 | 2.62 | 1.49700 | 81.54 |
| 17 | −16.559 | Variable | | |
| 18* | 46.247 | 1.20 | 1.52540 | 55.78 |
| 19* | −43.569 | 0.30 | | |
| 20 | ∞ | 0.40 | 1.51633 | 64.14 |
| 21 | ∞ | 0.50 | | |
| 22 | ∞ | 0.50 | 1.51633 | 64.14 |
| 23 | ∞ | 0.37 | | |
| Image plnae | ∞ | | | |

Aspherical coefficients

3rd surface

K = 0.000, A4 = 1.02574e−05, A6 = −8.39719e−09, A8 = −2.64754e−11, A10 = 6.83943e−14

4th surface

K = 0.000, A4 = −4.53875e−04, A6 = 8.57002e−06, A8 = −5.72889e−08, A10 = −1.82066e−10, A12 = 5.38084e−12

5th surface

K = 0.000, A4 = −5.72218e−04, A6 = −1.74178e−05, A8 = 1.29422e−06, A10 = −7.64954e−08, A12 = 1.11700e−09

8th surface

K = 0.000, A4 = −2.79269e−04, A6 = −5.09169e−07, A8 = −3.54014e−07, A10 = 2.17717e−08, A12 = −5.52704e−10

10th surface

K = 0.000, A4 = 7.16997e−05, A6 = −5.79853e−06, A8 = 8.68128e−06, A10 = −8.87271e−07, A12 = 5.14981e−08

12th surface

K = 0.000, A4 = 1.16525e−03, A6 = 1.42264e−05, A8 = 1.18891e−05, A10 = −9.27354e−07, A12 = 7.40194e−08

18th surface

K = 0.000, A4 = −6.75878e−04, A6 = 3.47904e−05, A8 = −3.62323e−06, A10 = 6.43945e−08

19th surface

K = 0.000, A4 = 1.33179e−03, A6 = −1.05913e−04, A8 = 8.70045e−08, A10 = 3.74188e−08 zoom data

| | WE | ST | TE |
|---|---|---|---|
| IH | 3.84 | 3.84 | 3.84 |
| focal length | 5.10 | 15.80 | 48.86 |
| Fno. | 3.26 | 5.08 | 6.00 |
| 2ω (°) | 81.78 | 26.00 | 8.64 |
| BF | 1.76 | 1.76 | 1.76 |

-continued unit mm

| | | | |
|---|---|---|---|
| total length | 47.47 | 57.23 | 66.70 |
| d3 | 0.30 | 8.95 | 18.78 |
| d8 | 16.84 | 8.23 | 1.89 |
| d15 | 5.59 | 15.60 | 20.83 |
| d17 | 2.70 | 2.41 | 3.15 |

Unit focal length f1 = 35.72  f2 = −7.21  f3 = 11.89  f4 = 18.99  f5 = 42.90

FIGS. 6A through 10C are aberration diagrams of the zoom lenses according to the first to the fifth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 6A, 7A, 8A, 9A, and 10A, in the intermediate focal length state in FIGS. 6B, 7B, 8B, 9B, and 10B, and at the telephoto end in FIGS. 6C, 7C, 8C, 9C, and 10C. The sign "ω" in these diagrams represents half angle of field.

In sixth to tenth embodiments, the zoom lenses according to the first to fifth embodiments are respectively used in an image pickup apparatus that has a function of correcting distortion electrically, wherein the shape of the effective image pickup area is changed upon zooming. Therefore, in the sixth to tenth embodiments, the image height and the angle of field at a zoom position are different from those in the respective corresponding embodiments.

In the sixth to tenth embodiments, barrel distortion that occurs at wide angle positions is corrected electrically, and a thus-corrected image is recorded or displayed.

In the zoom lenses according to the embodiments, barrel occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

In the sixth to tenth embodiments, the effective image pickup area is designed in such a way that the effective image pickup area at the wide angle end has a dimension in the shorter side direction equal to the dimension in the shorter side direction of the photoelectric conversion surface, and a distortion of approximately −3% remains after image processing. As a matter of course, a barrel shaped area smaller than that described above may be set as the effective image pickup area, and image resulting from transformation of this area into a rectangular area may be recorded/reproduced.

The zoom lens used in the sixth embodiment is the same as the zoom lens according to the first embodiment.

The zoom lens used in the seventh embodiment is the same as the zoom lens according to the second embodiment.

The zoom lens used in the eighth embodiment is the same as the zoom lens according to the third embodiment.

The zoom lens used in the ninth embodiment is the same as the zoom lens according to the fourth embodiment.

The zoom lens used in the tenth embodiment is the same as the zoom lens according to the fifth embodiment.

Data in example 6 are as shown below.

|  | WE | ST | TE |
|---|---|---|---|
| IH | 3.57 | 3.84 | 3.84 |
| focal length | 5.10 | 15.80 | 48.87 |
| Fno. | 3.33 | 5.10 | 6.00 |
| 2ω (°) | 82.12 | 25.92 | 8.62 |

Data in example 7 are as shown below.

|  | WE | ST | TE |
|---|---|---|---|
| IH | 3.57 | 3.84 | 3.84 |
| focal length | 5.10 | 15.80 | 48.86 |
| Fno. | 3.33 | 5.09 | 6.06 |
| 2ω (°) | 82.02 | 25.96 | 8.64 |

Data in example 8 are as shown below.

|  | WE | ST | TE |
|---|---|---|---|
| IH | 3.57 | 3.84 | 3.84 |
| focal length | 5.10 | 15.80 | 48.87 |
| Fno. | 3.28 | 5.11 | 6.15 |
| 2ω (°) | 81.97 | 25.90 | 8.65 |

Data in example 9 are as shown below.

|  | WE | ST | TE |
|---|---|---|---|
| IH | 3.57 | 3.84 | 3.84 |
| focal length | 5.10 | 15.80 | 48.87 |
| Fno. | 3.24 | 5.11 | 6.19 |
| 2ω (°) | 82.03 | 25.90 | 8.65 |

Data in example 10 are as shown below.

|  | WE | ST | TE |
|---|---|---|---|
| IH | 3.58 | 3.84 | 3.84 |
| focal length | 5.10 | 15.80 | 48.86 |
| Fno. | 3.26 | 5.08 | 6.00 |
| 2ω (°) | 81.78 | 26.00 | 8.64 |

Values of conditional expressions (1)-(15) are as shown below.

|  | Example 1 | Example 2 | Example 3 | Example 4 | Example 5 |
|---|---|---|---|---|---|
| (1) $(r_{c1rp} + r_{c1rr})/(r_{c1rp} - r_{c1rr})$ | −0.627 | −0.633 | −0.605 | −0.600 | −0.638 |
| (2) $P_{w5}/P_{w1}$ | 0.831 | 0.823 | 0.853 | 0.887 | 0.833 |
| (3) $D_{G2}/f_w$ | 1.240 | 1.240 | 1.240 | 1.244 | 1.240 |
| (4) $(r_{G5tF} + r_{G5tR})/(r_{G5tF} - r_{G1tR})$ | −0.692 | −0.697 | −0.673 | −0.669 | −0.702 |
| (5) $(r_{G5tF} + r_{G5tR})/(r_{G5tF} - r_{G5tR})$ | 0.028 | 0.072 | 0.099 | 0.134 | 0.113 |

-continued

|  | Example 1 | Example 2 | Example 3 | Example 4 | Example 5 |
|---|---|---|---|---|---|
| (6) $Nd_{G1t}$ | 1.592 | 1.592 | 1.592 | 1.592 | 1.592 |
| (7) $vd_{G1t}$ | 67.020 | 67.020 | 67.020 | 67.020 | 67.020 |
| (8) $Nd_{G5t}$ | 1.525 | 1.497 | 1.497 | 1.497 | 1.525 |
| (9) $vd_{G5t}$ | 55.780 | 81.540 | 81.540 | 81.540 | 55.780 |
| (10) $C_{j(w)}/f_w$ | 9.068 | 9.103 | 9.099 | 9.043 | 8.908 |
| (11) $C_{j(t)}/f_t$ | 1.335 | 1.339 | 1.358 | 1.357 | 1.323 |
| (12) $C_{j(t)}/C_{j(w)}$ | 1.411 | 1.409 | 1.430 | 1.438 | 1.423 |
| (13) $|M_{G2}/M_{G3}|$ | 0.021 | 0.025 | 0.081 | 0.095 | 0.048 |
| (14) $D_{G23}/D_{G34}$ | 2.857 | 2.888 | 2.918 | 2.951 | 3.011 |
| (15) $Ft/fw$ | 9.58 | 9.58 | 9.58 | 9.58 | 9.58 |

A flare stop may be provided in addition to the aperture stop in order to eliminate unwanted light that may cause ghost images, lens flare or the like.

The flare stop may be disposed on the object side of the first lens unit, between the first lens unit and the second lens unit, between the second lens unit and the third lens unit, between the third lens unit and the fourth lens unit, between the fourth lens unit and the fifth lens unit, or between the lens unit closest to the image plane and the image plane. A frame member may be adapted to cut flare rays. Alternatively, a separate member may be provided for this purpose. Alternatively, a flare stop may be provided on a component in the optical system by direct printing, by painting, or by attaching a sheet or the like. The aperture of the flare stop may have various shapes such as circular, elliptical, rectangular, or polygonal shape, or the shape of the aperture may be defined by a curve specified by a mathematical function. The flare stop may be adapted to cut not only detrimental beams but also beams that may cause coma flare etc. in the peripheral region of the picture area.

Brightness fall-off (or shading) in the peripheral region of the picture area may be reduced by shifting the positions of micro lenses on the CCD. For examples, the design of the micro lenses on the CCD may be varied with changes in the angle of incidence of rays at different image heights. Brightness fall-off in the peripheral region of the picture area may be corrected by image processing.

Anti-reflection coating may be applied on each lens to reduce ghost images and flare. Use of multi-layer coating, which can effectively reduce ghost images and flare, is desirable. Coating for cutting infrared light may be applied on a lens surface(s) and/or the cover glass etc.

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-

92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is abase, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 11:
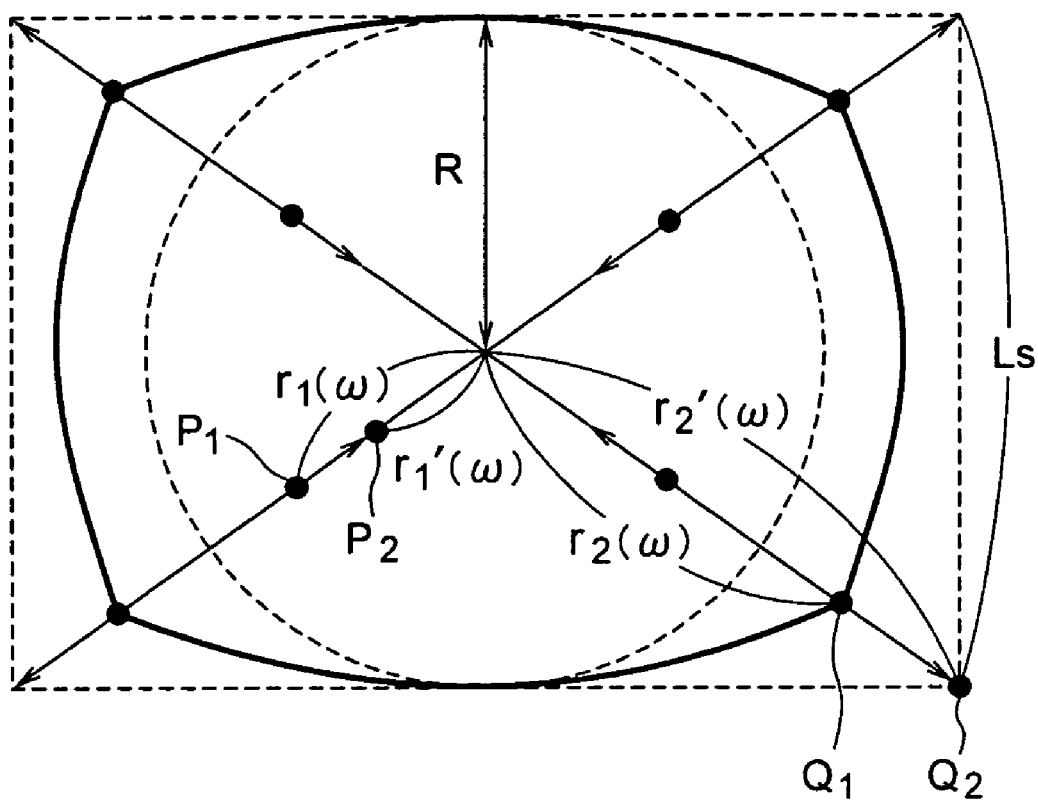
FIG. 11 is a diagram illustrating correction of distortion.

For example, as shown in FIG. 11, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 11, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega)=\alpha \cdot f \tan \omega (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha=R/Y=R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel $(Xi, Yj)$, a method of determining coordinates of a destination of movement $(Xi', Yj')$ may be used. When two or more points $(Xi, Yj)$ have moved to the coordinates $(Xi', Yj')$, an average of values of each pixel is taken. Moreover, when there is no point which has moved, interpolation may be performed by using a value of coordinate $(Xi', Yj')$ of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega)=\alpha\cdot f\cdot\tan\omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha\cdot f\cdot\tan\omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan\omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f>y/\tan\omega.$$

In other words, when the focal length f of the imaging system, and the image height y are let to be fixed, a value of ω becomes large.

(Digital Camera)

Figure 12:
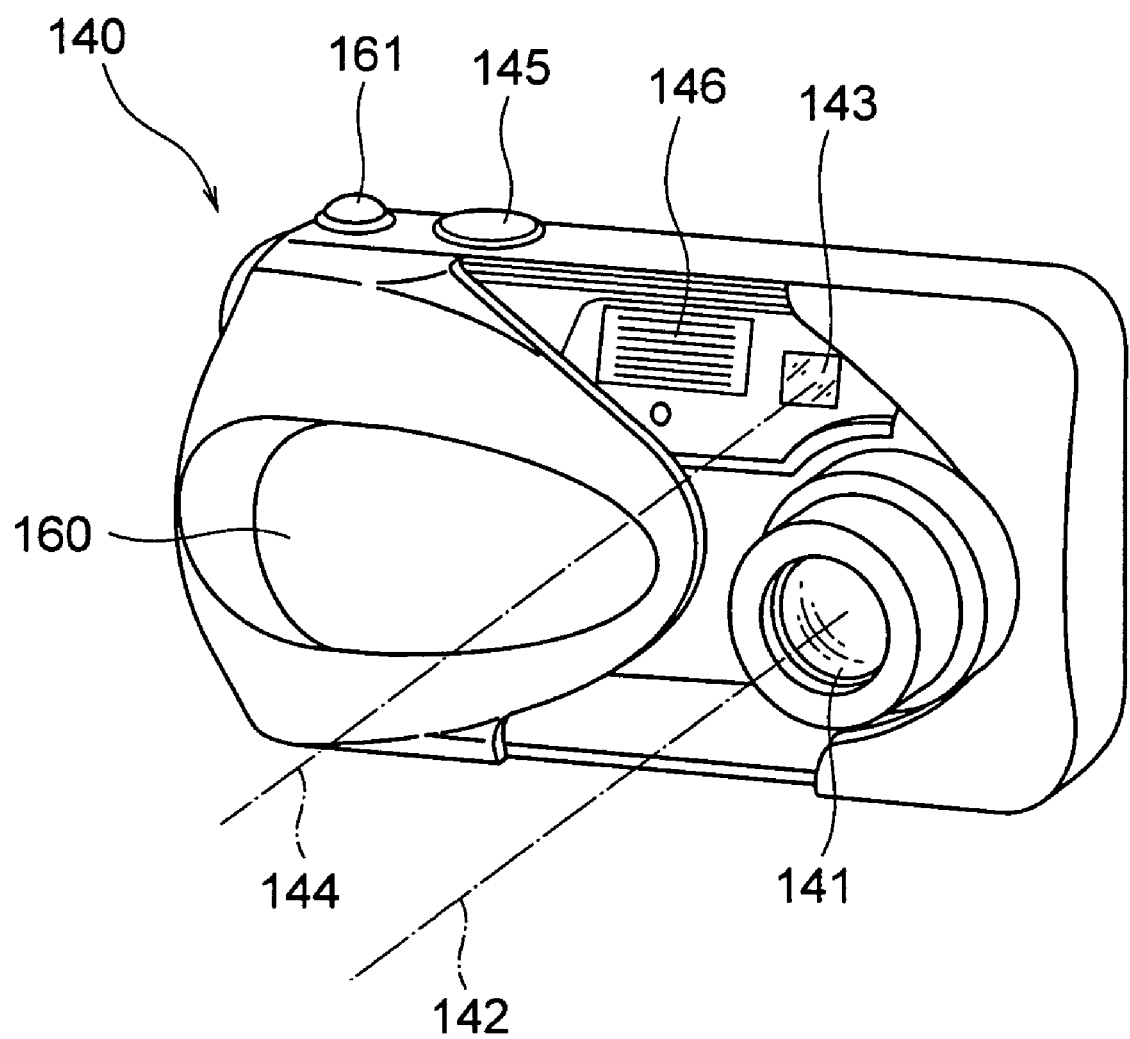
FIG. 12 is a front perspective view showing an outer appearance of a digital camera equipped with a collapsible zoom lens according to the present invention.
Figure 13:
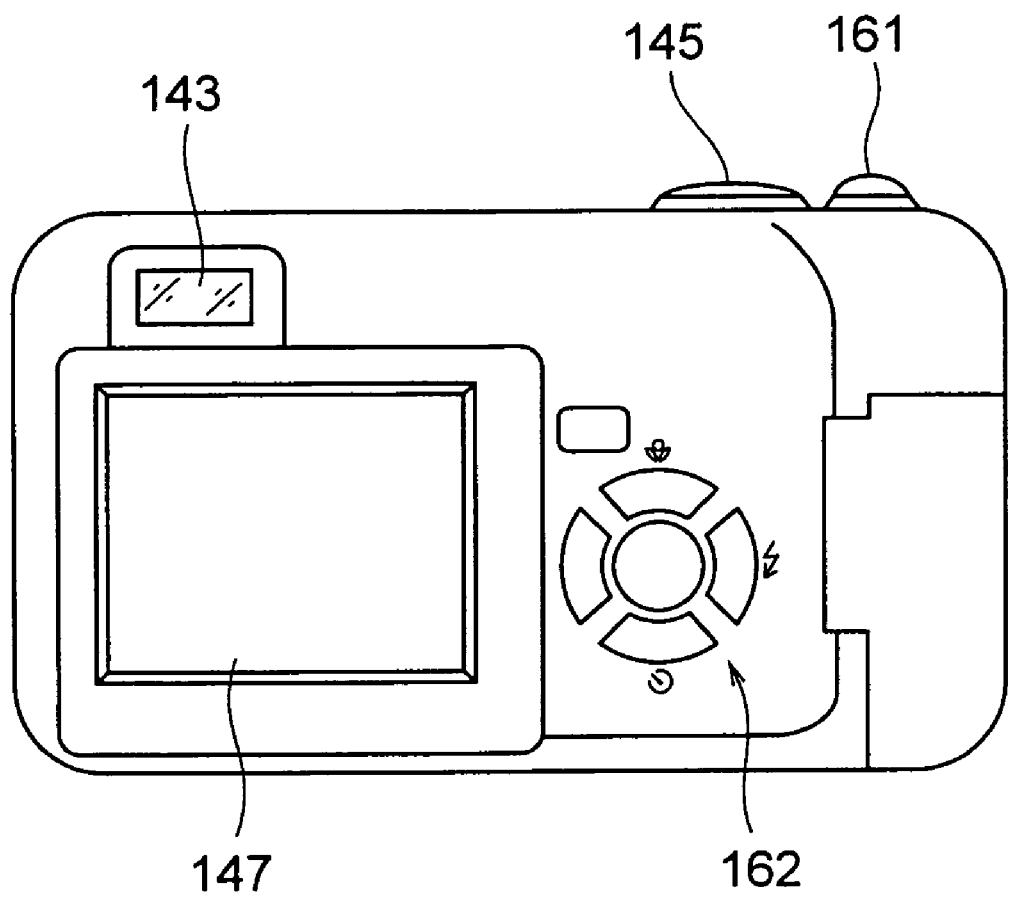
FIG. 13 is a rear perspective view of the digital camera.

FIG. 12 to FIG. 14 are conceptual diagrams of a structure of a digital camera according to the present invention in which a zoom lens system described above is incorporated in a taking optical system 141. FIG. 12 is a front perspective view showing an appearance of a digital camera 140, FIG. 13 is a rear view of the same, and FIG. 14 is a schematic cross-sectional view showing a structure of the digital camera 140. In FIG. 12 and FIG. 14, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 14, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

FIG. 15 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 15, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

Various modifications may be made on the above-described embodiments in accordance with the claims and the appended mode described below.

The zoom lens according to the present invention may be configured, for example, as follows.

(Appended Mode 1)

A zoom lens including, in order from its object side:
a first lens unit having a positive refracting power, which is movable during zooming;
a second lens unit having a negative refracting power, which is movable during zooming;
a third lens unit having a positive refracting power, which is movable during zooming;
a fourth lens unit having a positive refracting power, which is movable during zooming;
a fifth lens unit having a positive refracting power, which is movable or stationary during zooming, wherein
the zoom lens comprises an aperture stop, which moves integrally with the third lens unit during zooming,
the first lens unit is located closer to the object side at the telephoto end than at the wide angle end;
the third lens unit is located closer to the object side at the telephoto end than at the wide angle end;
the first lens unit is composed of only one cemented lens made up of a negative lens element and a positive lens element arranged in order from the object side, and
the third lens unit includes at least two positive lens elements.

As described in the foregoing, the zoom lens according to the present invention is advantages in achieving good optical performance and downsizing while achieving a high zoom ratio.

What is claimed is:

1. A zoom lens comprising, in order from its object side:
a first lens unit having a positive refracting power, which is movable during zooming;
a second lens unit having a negative refracting power, which is movable during zooming;
a third lens unit having a positive refracting power, which is movable during zooming;
a fourth lens unit having a positive refracting power, which is movable during zooming;
a fifth lens unit having a positive refracting power, which is movable or stationary during zooming, wherein
the zoom lens comprises an aperture stop, which moves integrally with the third lens unit during zooming,
the first lens unit is located closer to the object side at the telephoto end than at the wide angle end;
the third lens unit is located closer to the object side at the telephoto end than at the wide angle end;
the first lens unit consists of a cemented lens made up of a negative lens element and a positive lens element that are arranged in order from the object side and cemented together, and
the third lens unit comprises two positive lens elements;
wherein the zoom lens satisfies the following conditional expression (1):

$$-1.03 < (r_{G1RF} + r_{G1RR})/(r_{G1RF} - r_{G1RR}) < -0.30 \quad (1)$$

where $r_{G1RF}$ is a paraxial radius of curvature of a lens surface closest to the object side in the first lens unit, and $r_{G1RR}$ is a paraxial radius of curvature of a lens surface closest to the image side in the first lens unit.

2. The zoom lens according to claim 1, wherein the zoom lens satisfies the following conditional expression (2):

$$0.3 < P_{w5}/P_{w1} < 2.0 \quad (2)$$

where $P_{w1}$ is a refracting power of the first lens unit, and $P_{w5}$ is a refracting power of the fifth lens unit.

3. The zoom lens according to claim 1, wherein the fifth lens unit consists of one positive lens element.

4. The zoom lens according to claim 1, wherein focusing operation from an object at a long distance to an object at a short distance is performed by moving the fourth lens unit toward the object side.

5. The zoom lens according to claim 1, wherein the second lens unit comprises a negative lens element and a cemented lens made up of a negative lens element and a positive lens element, and the zoom lens satisfies the following conditional expression (3):

$$0.8 < D_{G2}/f_W < 2.0 \tag{3}$$

where $D_{G2}$ is a thickness of the second lens unit on the optical axis, and $f_w$ is a focal length of the entire zoom lens system at the wide angle end.

6. The zoom lens according to claim 1, wherein the zoom lens satisfies the following conditional expression (4):

$$-1.0 < (r_{G1tF} + r_{G1tR})/(r_{G1tF} - r_{G1tR}) < -0.2 \tag{4}$$

where $r_{G1tF}$ is a paraxial radius of curvature of an object side surface of the positive lens element in the first lens unit, and $r_{G1tR}$ is a paraxial radius of curvature of an image side surface of the positive lens element in the first lens unit.

7. The zoom lens according to claim 1, wherein the zoom lens satisfies the following conditional expressions (6) and (7):

$$1.45 < Nd_{G1t} < 1.6 \tag{6}$$

$$65 < vd_{G1t} < 90 \tag{7}$$

where $Nd_{G1t}$ is a refractive index for the d-line of the positive lens element in the first lens unit, and $vd_{G1t}$ is an Abbe number of the positive lens element in the first lens unit.

8. The zoom lens according to claim 1, wherein the third lens unit consists, in order from the object side, of two positive lens elements and one negative lens element.

9. The zoom lens according to claim 1, wherein the first lens unit comprises at least one aspheric surface, and the zoom lens satisfies the following conditional expression (10):

$$4.0 < C_j(w)/f_w < 15.0 \tag{10}$$

where $f_w$ is a focal length of the entire zoom lens system at the wide angle end, and $C_j(w)$ is an entire length of the zoom lens at the wide angle end, the entire length being defined as a sum of a distance, on the optical axis, from an incidence surface of a lens located closest to the object side in the zoom lens to an emergence surface of a lens located closest to the image side in the zoom lens and a back focus represented by an equivalent distance in air.

10. The zoom lens according to claim 1, wherein the zoom lens satisfies the following conditional expression (11):

$$0.8 < C_j(t)/f_t < 2.5 \tag{11}$$

where $f_t$ is a focal length of the entire zoom lens system at the telephoto end, and $C_j(t)$ is an entire length of the zoom lens at the telephoto end, the entire length being defined as a sum of a distance, on the optical axis, from an incidence surface of a lens located closest to the object side in the zoom lens to an emergence surface of a lens located closest to the image side in the zoom lens and a back focus represented by an equivalent distance in air.

11. The zoom lens according to claim 1, wherein the zoom lens satisfies the following conditional expression (12):

$$1.1 < C_j(t)/C_j(w) < 1.8 \tag{12}$$

where $C_j(w)$ is an entire length of the zoom lens at the wide angle end, and $C_j(t)$ is an entire length of the zoom lens at the telephoto end, the entire length being defined as a sum of a distance, on the optical axis, from an incidence surface of a lens located closest to the object side in the zoom lens to an emergence surface of a lens located closest to the image side in the zoom lens and a back focus represented by an equivalent distance in air.

12. The zoom lens according to claim 1, wherein during zooming from the wide angle end to the telephoto end, the second lens unit moves first toward the object side and thereafter toward the image side, and the zoom lens satisfies the following conditional expression (13):

$$0.01 < |M_{G2}/M_{G3}| < 0.3 \tag{13}$$

where $M_{G2}$ is an amount movement of the second lens unit during zooming from the wide angle end to the telephoto end, and $M_{G3}$ is an amount movement of the third lens unit during zooming from the wide angle end to the telephoto end.

13. The zoom lens according to claim 1, wherein the zoom lens satisfies the following conditional expression (14):

$$2.0 < D_{G23}/D_{G34} < 4.5 \tag{14}$$

where $D_{G23}$ is a distance between the second lens unit and the third lens unit on the optical axis at the wide angle end, and $D_{G24}$ is a distance between the third lens unit and the fourth lens unit on the optical axis at the wide angle end.

14. The zoom lens according to claim 1, wherein the zoom lens satisfies the following conditional expression (15):

$$6.8 < f_t/f_w < 50.0 \tag{15}$$

where $f_t$ is a focal length of the entire zoom lens system at the telephoto end, and $f_w$ is a focal length of the entire zoom lens system at the wide angle end.

15. The image pickup apparatus comprising:
the zoom lens according to claim 1; and
an image transforming section that transforms, by image processing, an electrical signal representing an image containing distortion attributed to the zoom lens into an image signal representing an image in which distortion is corrected.

16. The zoom lens according to claim 1, wherein the fourth lens unit consists of one positive lens element.

17. The zoom lens according to claim 16, wherein the zoom lens satisfies the following conditional expression (5):

$$0 < (r_{G5tF} + r_{G5tR})/(r_{G5tF} - r_{G5tR}) < 0.5 \tag{5}$$

where $r_{G5tF}$ is a paraxial radius of curvature of an object side surface of the positive lens element in the fifth lens unit, and $r_{G5tR}$ is a paraxial radius of curvature of an image side surface of the positive lens element in the fifth lens unit.

18. The zoom lens according to claim 16, wherein the zoom lens satisfies the following conditional expressions (8) and (9):

$$1.45 < Nd_{G5t} < 1.6 \tag{8}$$

$$65 < vd_{G5t} < 90 \tag{9}$$

where $Nd_{G5t}$ is a refractive index for the d-line of the positive lens element in the fifth lens unit, and $vd_{G5t}$ is an Abbe number of the positive lens element in the fifth lens unit.

* * * * *